(12) United States Patent
Manabe et al.

(10) Patent No.: US 7,646,137 B2
(45) Date of Patent: Jan. 12, 2010

(54) ACTUATOR AND ITS CONTROL METHOD AND LENS DEVICE

(75) Inventors: Mitsuo Manabe, Saitama (JP); Ryota Sasaki, Saitama (JP); Tomonari Masuzawa, Saitama (JP); Toshiaki Ezawa, Saitama (JP)

(73) Assignee: Fujinon Corporation, Saitama (JP)

( * ) Notice: Subject to any disclaimer, the term of this patent is extended or adjusted under 35 U.S.C. 154(b) by 461 days.

(21) Appl. No.: 11/148,384

(22) Filed: Jun. 9, 2005

(65) Prior Publication Data

US 2005/0275315 A1 Dec. 15, 2005

(30) Foreign Application Priority Data

| Jun. 11, 2004 | (JP) | ............................... 2004-174183 |
| Jun. 11, 2004 | (JP) | ............................... 2004-174184 |
| Jun. 11, 2004 | (JP) | ............................... 2004-174185 |
| Jun. 14, 2004 | (JP) | ............................... 2004-175649 |
| Jun. 14, 2004 | (JP) | ............................... 2004-175651 |

(51) Int. Cl.
*H01L 41/08* (2006.01)

(52) U.S. Cl. ................................. 310/323.17

(58) Field of Classification Search ................ 310/323, 310/328
See application file for complete search history.

(56) References Cited

U.S. PATENT DOCUMENTS

| 5,225,941 A | 7/1993 | Saito et al. |
| 5,319,257 A | 6/1994 | McIntyre |
| 5,675,444 A | 10/1997 | Ueyama et al. |
| 5,907,212 A | 5/1999 | Okada |
| 6,091,552 A | 7/2000 | Ueyama |
| 6,188,161 B1 * | 2/2001 | Yoshida et al. ............... 310/328 |
| 6,215,605 B1 * | 4/2001 | Kuwana et al. ............. 359/824 |
| 6,320,298 B1 | 11/2001 | Kawabe |
| 6,373,170 B1 | 4/2002 | Hills |
| 2004/0084996 A1 | 5/2004 | Schmid et al. |
| 2006/0061234 A1 * | 3/2006 | Ito et al. ..................... 310/317 |

FOREIGN PATENT DOCUMENTS

| DE | 35 11 447 A1 | 12/1985 |
| JP | 60-200776 A | 10/1985 |
| JP | 62-085682 A | 4/1987 |
| JP | 62085682 A | 4/1987 |
| JP | 63039474 | 2/1988 |
| JP | 7-298656 A | 11/1995 |
| JP | 2633066 B2 | 4/1997 |
| JP | 09191665 | 7/1997 |
| JP | 10-232337 A | 9/1998 |
| JP | 10234192 A | 9/1998 |
| JP | 2000-050660 A | 2/2000 |
| JP | 2001-45777 A | 2/2001 |
| WO | WO-93/19494 A1 | 9/1993 |

* cited by examiner

*Primary Examiner*—J. SanMartin
(74) *Attorney, Agent, or Firm*—Birch, Stewart, Kolasch & Birch, LLP

(57) ABSTRACT

An actuator which drives a lens frame in an optical axis direction is constructed by piezoelectric elements, driving members, and a pressing spring. The piezoelectric elements are placed at opposite sides with a driven plate therebetween, and the driving members are fixed to the respective piezoelectric elements. The driving members are pressed against the driven plate from both sides by the pressing spring.

9 Claims, 22 Drawing Sheets

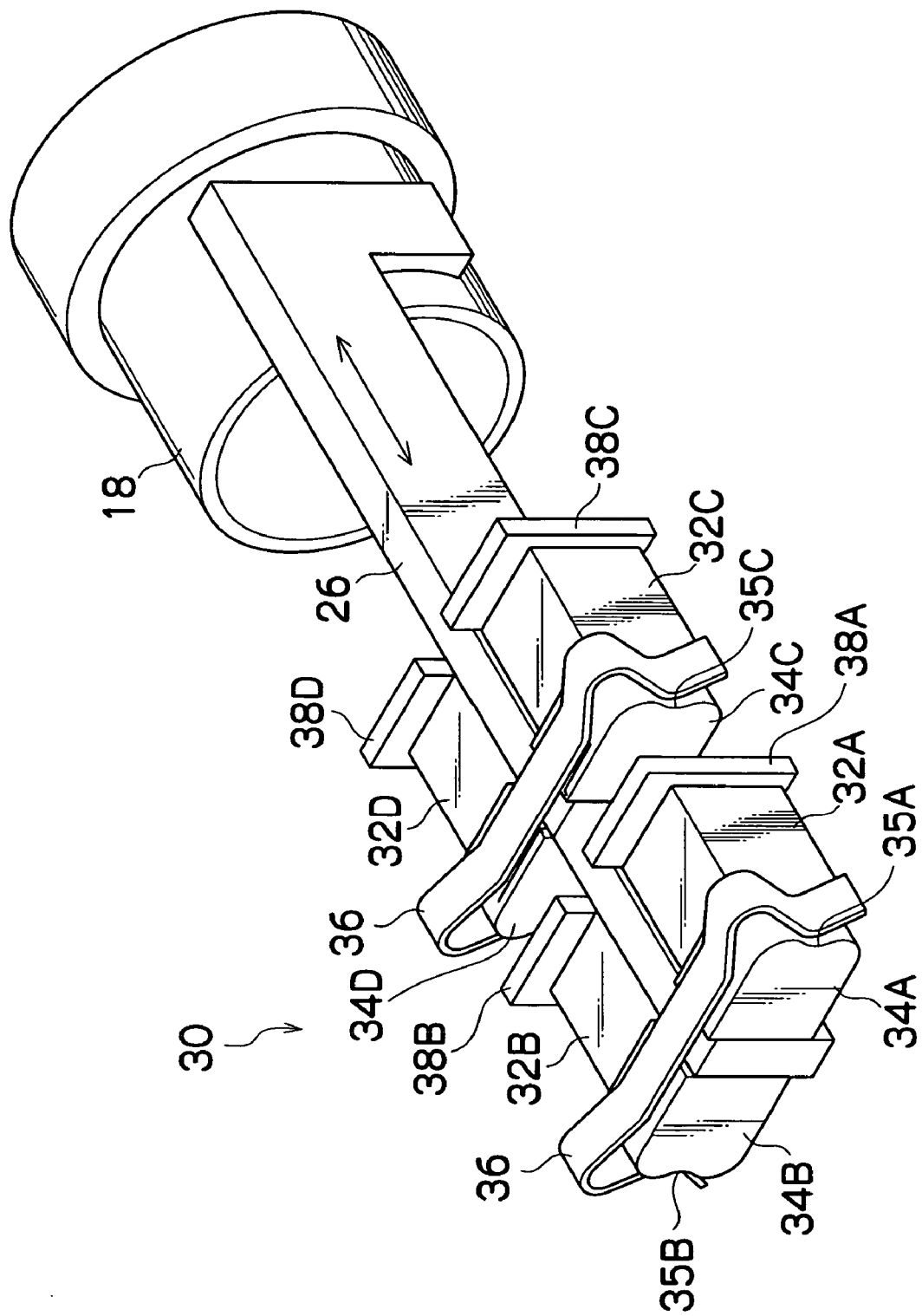

ACTUATOR AND ITS CONTROL METHOD AND LENS DEVICE

BACKGROUND OF THE INVENTION

1. Field of the Invention

The present invention relates to an actuator and its control method, and a lens device, and particularly relates to an actuator which is loaded on a compact precision apparatus such as a digital camera and a cellular phone to drive a zoom lens and a focus lens.

2. Related Art

There is an actuator using a piezoelectric element as a drive device of a lens part of a digital camera or the like. For example, in an actuator in Japanese Patent No. 2633066, a driving rod is fixed to an end surface of the piezoelectric element and a lens-barrel is slidably supported at the driving rod. A plate spring is mounted to the lens-barrel so that the frictional force works between the lens-barrel and the driving rod by the elastic force of the plate spring. A driving pulse in a substantially sawtooth-shaped waveform is applied to the piezoelectric element, and the piezoelectric element deforms at different speeds in an extending direction and a contracting direction. When, for example, the piezoelectric element gradually deforms, the lens-barrel moves with the driving rod. On the other hand, when the piezoelectric element deforms fast, the lens-barrel stays at the same position by the inertia of its mass. Accordingly, by repeatedly applying the driving pulse in the substantially sawtooth-shaped waveform to the piezoelectric element, the lens-barrel can be intermittently moved at a fine pitch.

However, the actuator described in Japanese Patent No. 2633066 transmits a driving force via the long driving rod, and therefore, vibration of the piezoelectric element is absorbed by the driving rod and attenuated, thus causing the problem of being unable to move the lens-barrel accurately. The vibration at a high frequency especially has a large attenuation rate by the driving rod, and therefore, responsiveness of the lens-barrel becomes unfavorable. Therefore, the actuator in Japanese Patent No. 2633066 can be controlled only with the driving pulse at a low frequency, thus causing the problem of the number of moving times of the lens-barrel per unit time becoming small. Therefore, in order to increase the moving speed of the lens-barrel in the actuator in Japanese Patent No. 2633066, it is necessary to increase the applied voltage to increase the displacement amount of the piezoelectric element, and increase the moving amount of the lens-barrel at one time.

In Japanese Patent Application Laid-open No. 2000-50660, the moving amount at one time is increased by raising the power supply voltage of 5 V to 30 V, and thereby the moving speed of the lens-barrel is increased. Therefore, in Japanese Patent Application Laid-open No. 2000-50660, a boosting device becomes necessary, thus causing the problems of the device becoming large in size, and requiring a complicated control.

In an actuator described in Japanese Patent Application Laid-open No. 10-232337, an engaging member is mounted to an end surface in the displacing direction of the piezoelectric element, and this engaging member is frictionally engaged with the movable plate, and the lens-barrel is mounted to the movable plate. By applying the driving pulse to the piezoelectric element, the vibration is transmitted via the engaging member, and the movable plate and the lens-barrel move.

Incidentally, in the actuators disclosed in Japanese Patent No. 2633066, Japanese Patent Application Laid-open No. 2000-50660, and Japanese Patent Application Laid-open No. 10-232337, the speed difference between extension time and the contraction time has to be set so that the magnitude relation of the frictional force of the driving member (the above-described driving member, engaging member and the like) and the driven member (the above-described lens-barrel, moving plate and the like) and the inertia force of the driven member is inverted at the extension time and the contraction time of the piezoelectric element. Accordingly, there is the problem that selection of the spring force which frictionally engages the driven member and the driving member with a suitable frictional force is extremely difficult. Especially in Japanese Patent Application Laid-open No. 10-232337, the spring force is generated by the shape of the driving member (engaging member), and therefore, it is very difficult to set the suitable spring force. Therefore, Japanese Patent Application Laid-open No. 10-232337 has the possibility that the driven member does not slide because the frictional force becomes large, and the driven part does not move because the frictional force becomes small, as a result of which, the driven member cannot be moved accurately.

In the actuator disclosed in Japanese Patent Application Laid-open No. 10-232337, the movable plate is held from both sides with the engaging member to be frictionally engaged, and there is the problem that a rattle occurs to the movable plate in the direction orthogonal to the holding direction. Therefore, there arises the problem that the movable plate (driven member) cannot be accurately moved.

Further, the actuators disclosed in Japanese Patent No. 2633066, Japanese Patent Application Laid-open No. 2000-50660, and Japanese Patent Application Laid-open No. 10-232337 have the problem that the frictional forces between the driving member (the above described driving rod, engaging member and the like) and the driven member (the above-described lens-barrel, moving plate and the like) easily become unstable. Especially when machining accuracy of the driving member and the driven member is low, there is the possibility that the aforesaid frictional force changes in accordance with the contact position of the driven member and the driving member, and the frictional force changes in accordance with the individual actuators. Therefore, the conventional actuators have the problem that it is difficult to move the driven member stably and accurately.

When the actuators disclosed in Japanese Patent No. 2633066, Japanese Patent Application Laid-open No. 2000-50660, and Japanese Patent Application Laid-open No. 10-232337 are applied to lens devices, position detectors which detect the position of the lens-barrel are needed. As the position detector, for example, a transmission type photo-interrupter, and a reflection type photo-reflector are used, and based on the detection values of the position detectors, drive control of the actuator is performed.

The photo-interrupter and the photo-reflector themselves are very compact, but a shielding body and a reflection plate are large, and thus causing the problem that the lens device becomes large in size.

SUMMARY OF THE INVENTION

The present invention is made in such circumstances, and it is an object of the present invention to provide an actuator which can stably and accurately move the driven member, and its control method. Another object of the present invention is to provide an actuator which prevents occurrence of rattle between the driven member and the driving member, and can accurately move the driven member. Still another object of the present invention is to provide an actuator which is capable of exerting a constant frictional force between the driving member and the driven member, and can stably and accurately move the driven member.

Further, it is an object of the present invention to provide a lens device which can be made compact in the lens device including an actuator using a piezoelectric element and a position detector.

In order to attain the above-described objects, the present invention according to a first aspect is, in an actuator comprising a piezoelectric element, a driving member integrally mounted to the piezoelectric element, a driven member frictionally engaged with the driving member and provided to extend in a driving direction, and an urging device which urges the driving member to the driven member, characterized in that a plurality of piezoelectric elements and driving members are provided and placed at both sides of the driven member, and the driven member is held from both sides by the driving members to be frictionally engaged with the driving members.

According to the invention of the first aspect, the frictional forces of the driven member and the driving members can be stably obtained by holding the driven member from both sides by a plurality of driving members, and the driven member can be stably and accurately moved.

Further, according to the invention of the first aspect, the driven member is provided to extend in the driving direction, and the frictional engaging surfaces of the driven member and the driving members are always kept at constant position with respect to the piezoelectric elements. Therefore, the frictional engaging surfaces can be always placed in the vicinity of the piezoelectric elements. Accordingly, the vibrations of the piezoelectric elements are transmitted to the driven member without being attenuated at the driving member, and hence, even when the driving pulses at high frequencies are applied to the piezoelectric elements, the driven member can be reliably moved. Thereby, the driven member can be moved at a high speed even at a low voltage.

The invention according to a second aspect is, in the invention of the first aspect, characterized in that the plurality of driving members are held by a common plate spring which is the urging device, and are frictionally engaged with the driven member. According to the invention of the second aspect, the plurality of driving members are held by the common plate spring, and therefore, the frictional force can be uniformly given between each of the driving members and the driven member.

The invention according to a third aspect is, in the invention of the first aspect, characterized in that the urging device has two holding parts and is constructed to exhibit an urging force in a direction to narrow a space of the two holding parts, and the two holding parts are respectively mounted to press the different driving members and hold the driving members. According to the invention of the third aspect, the frictional force can be uniformly given between each of the driving members and the driven member.

The invention according to a fourth aspect is, in the invention of the first aspect, characterized in that the actuator is a lens moving actuator which moves a lens frame integrally mounted to the driven member along an optical axis.

In order to achieve the above described objects, the invention according to a fifth aspect is, in a method for controlling an actuator including a plurality of piezoelectric elements, a plurality of driving members integrally mounted to the plurality of piezoelectric elements, and a driven member frictionally engaged with the plurality of driving members and provided to extend in a driving direction, and a control part which applies voltage of a pulse waveform to the plurality of piezoelectric elements in predetermined timings, with the piezoelectric elements and the driving members placed at both sides of the driven member, and the driven member held from both sides by the driving member to be frictionally engaged with the driving members, characterized in that the control part applies the voltage so that deforming speeds differ in extension and contraction of the piezoelectric elements, and the timings are equal among the plurality of piezoelectric elements on an occasion of a slow deforming speed, and the timings differ among the plurality of piezoelectric elements on an occasion of a high deforming speed.

According to the invention of the fifth aspect, the deforming speeds of the piezoelectric elements are made to differ at the extension time and at the contraction time, and therefore, the driven member moves with the driving members on the occasion of a slow deforming speed, while the driven member slips with respect to the driving members and stops on the occasion of a high deforming speed. Accordingly, the driven member can be moved in one direction.

According to the invention of the fifth aspect, the timings are made equal among a plurality of piezoelectric elements on the occasion of the slow deforming speed, and therefore, the driving force becomes large, and the driven member can be reliably moved. On the occasion of the high deforming speed, the timings are made to differ among the plurality of piezoelectric elements, and therefore, the driven member can be reliably prevented from moving with the driving members, thus making it possible to reliably stop the driven member. Therefore, the driven member can be accurately moved. The difference of the driving forces becomes large at the extension time and the contraction time of the piezoelectric elements, and therefore, setting of the frictional force of the driven member and the driving member is facilitated.

In order to achieve the above described object, the invention according to a sixth aspect is, in a method for controlling an actuator including a plurality of piezoelectric elements, a plurality of driving members integrally mounted to the plurality of piezoelectric elements, and a driven member frictionally engaged with the plurality of driving members and provided to extend in a driving direction, and a control part which applies voltage of a pulse waveform to the plurality of piezoelectric elements in predetermined timings, characterized in that the control part applies the voltage so that deforming speeds differ at an extension time and at a contraction time of the piezoelectric element, and the timings are equal among the plurality of piezoelectric elements on an occasion of a slow deforming speed, and the timings differ among the plurality of piezoelectric elements on an occasion of a high deforming speed.

According to the invention of the sixth aspect, the deforming speeds of the piezoelectric elements are made to differ at the extension time and the contraction time, and therefore, the driven member moves with the driving members on the occasion of the slow deforming speed, while on the occasion of the fast deforming speed, the driven member slips with respect to the driving members and stops. Accordingly, the driven member can be moved in one direction.

Further, according to the invention of the sixth aspect, the timings are made equal among the plurality of piezoelectric elements on the occasion of the slow deforming speed, and therefore, the driven member is driven by a plurality of driving members, thus making it possible to reliably move the driven member with a large driving force. Since the timings are made to differ among a plurality of piezoelectric elements on the occasion of the high deforming speed, the driving members move individually, and the driven member can be restrained from moving with the driving members, and the driven member can be reliably stopped. Therefore, according to the invention of the sixth aspect, the driven member can be accurately moved. The difference of the driving forces becomes large at the extension time and the contraction time of the piezoelectric element, and therefore, setting of the frictional force of the driven member and the driving member is facilitated.

Further, according to the invention of the sixth aspect, the driven member is provided to extend in the driving direction, and therefore, the frictional engaging surface of the driven member and the driving member is always kept at a constant position with respect to the piezoelectric element. Accordingly, the frictional engaging surface can be always placed in the vicinity of the piezoelectric element. As a result, the vibration of the piezoelectric element is transmitted to the driven member without being attenuated at the driving member, and therefore, even if a driving pulse at a high frequency is applied to the piezoelectric element, the driven member can be reliably moved. Therefore, the driven member can be moved at a high speed even at a low voltage.

The invention according to a seventh aspect is, in the invention of the sixth aspect, characterized in that the actuator is a lens moving actuator which moves a lens frame integrally mounted to the driven member along the optical axis.

In order to attain the above-described object, the invention according to an eighth aspect is, in an actuator comprising a piezoelectric element, a driving member integrally mounted to the piezoelectric element, a driven member frictionally engaged with the driving member and provided to extend in a driving direction, characterized in that a plurality of piezoelectric elements and driving members are provided and placed at both sides of the driven member, and the driven member is held from both sides by the plurality of driving members, and frictional engaging surfaces with the driving members, which are formed on both sides of the driven member are not parallel with each other.

According to the invention of the eighth aspect, the frictional engaging surfaces formed on both sides of the driven member are in the positional relation in which they are not parallel, and therefore, rattle of the driven member and the driving member can be prevented by holding the driven member from both sides by the driving members. "Not parallel" means that the surfaces or the extended surfaces are in the positional relation in which they intersect each other.

Further, according to the invention of the eighth aspect, the driven member is provided to extend in the driving direction, and therefore, the frictional engaging surface of the driven member and the driving member is always kept in a constant positional relation with respect to the piezoelectric element. Accordingly, the frictional engaging surface can be always placed in the vicinity of the piezoelectric element. As a result, the vibration of the piezoelectric element is transmitted to the driven member without being attenuated at the driving member, and therefore, when the driving pulse at a high frequency is applied to the piezoelectric element, the driven member can be reliably moved. Therefore, even at a low voltage, the driven member can be moved at a high speed.

Further, according to the invention of the eighth aspect, a plurality of piezoelectric elements and driving members are provided, and therefore, high output power is obtained, thus making it possible to move the driven member even when the driven member is heavy.

The invention according to a ninth aspect is, in the invention of the eighth aspect, characterized in that the driven member is formed into a triangle pole shape, and the frictional engaging surfaces are two side surfaces of the triangle pole.

The invention according to a tenth aspect is, in the invention of the eighth aspect, characterized in that the actuator is a lens moving actuator which moves a lens frame integrally mounted to the driven member along an optical axis.

In order to achieve the above described objects, the invention according to an eleventh aspect is, in an actuator comprising a piezoelectric element, a driving member integrally mounted to the piezoelectric element, and a driven member frictionally engaged with the driving member and provided to extend in a driving direction, characterized in that a projection part is formed on a frictional engaging surface of the driving member, and the driving member is brought into contact with the driven member via the projection part.

According to the invention of the eleventh aspect, the driving member and the driven member are in contact with each other via the projection part, and therefore, the driving member and the driven member are in point contact with each other, and a substantially constant frictional force can be always obtained. Therefore, according to the invention of the eleventh aspect, movement of the driven member can be always controlled accurately.

In order to achieve the above described objects, the invention according to a thirteenth aspect is, in an actuator comprising a piezoelectric element, a driving member integrally mounted to the piezoelectric element, and a driven member frictionally engaged with the driving member and provided to extend in a driving direction, characterized in that a protruding ridge part is formed to protrude along the driving direction on a frictional engaging surface of the driving member, and the driving member is brought into contact with the driven member via the protruding ridge part.

According to the invention of the thirteenth aspect, the driving member and the driven member are in contact with each other via the protruding ridge part in the driving direction, and therefore, the driving member and the driven member are in line contact with each other. Accordingly, when the driven member moves in the driving direction, a substantially constant frictional force can be always obtained. Accordingly, movement of the driven member can be always controlled accurately.

In order to achieve the above described object, the invention according to a fifteenth aspect is, in an actuator comprising a piezoelectric element, a driving member integrally mounted to the piezoelectric element, and a driven member frictionally engaged with the driving member and provided to extend in the driving direction, characterized in that a protruding ridge part is formed to protrude along the driving direction on a frictional engaging surface of the driven member, and the driven member is brought into contact with the driving member via the protruding ridge part.

According to the invention of the fifteenth aspect, the driving member and the driven member are in contact with each other via the protruding ridge part in the driving direction, and therefore, the driving member and the driven member are in line contact with each other. Accordingly, when the driven member moves in the driving direction, a substantially constant frictional force can be always obtained. Thereby, movement of the driven member can be always controlled accurately.

In order to achieve the above described object, the invention according to a seventeenth aspect is, in an actuator comprising a piezoelectric element, a driving member integrally mounted to the piezoelectric element, and a driven member frictionally engaged with the driving member and provided to extend in a driving direction, characterized in that the driven member is formed into a columnar shape, and a groove with an arc-shaped section with a smaller curvature than a curvature of the driven member is formed in the driving direction on a frictional engaging surface of the driving member, and the driven member is frictionally engaged in the groove.

According to the invention of the seventeenth aspect, the driven member in the columnar shape is frictionally engaged in the arc-shaped groove of the driving member. Therefore, the driving member and the driven member are in line contact with each other, and a substantially constant frictional force can be always obtained. Therefore, movement of the driven member can be always controlled accurately. According to the invention of the seventeenth aspect, rattle of the driven member and the driving member can be prevented.

The invention according to aspects 12, 14, 16 and 18 is characterized in that the piezoelectric elements and the driving members are provided at both sides of the driven member, and the driven member is held from both sides by the driving members. Therefore, according to the present invention, the driven member is held from both sides by the driving members, and therefore, the frictional force of the driven member and the driving member is obtained more stably.

In order to achieve the above described object, the invention according to a nineteenth aspect is, in a lens device comprising a piezoelectric element, a driving member integrally mounted to the piezoelectric element, a driven member frictionally engaged with the driving member and provided to extend along a driving direction, and a lens frame which is integrally mounted to the driven member and moved in the optical axis direction by a power of the piezoelectric element, characterized in that a position detector which detects a position of the lens frame is formed by using the driven member.

According to the invention of the nineteenth aspect, the position detector is provided by utilizing the driven member provided to extend in the driving direction. Therefore, the installation space for the position detector becomes small, and the lens device can be made compact. Further, according to the invention of the nineteenth aspect, the position detector is provided at the driven member, and therefore, the displacement amount of the lens frame can be accurately measured.

The invention according to claim 20 is, in the invention of the nineteenth aspect, characterized in that the position detector is a transmission type photo-interrupter with the driven member as a light shielding body. The photo-interrupter can perform highly precise detection with high output power, but it has the problem that the installation space becomes large on the other hand, and according to the invention of the twentieth aspect, the driven member also serves as the light shielding body of the photo-interrupter. Therefore, the lens device can be made compact.

The invention according to a twenty-first aspect is, in the invention of the nineteenth aspect, characterized in that the position detector is a reflection type photo-reflector with a reflection surface formed on the driven member. According to the invention of the twenty-first aspect, the reflection surface of the photo-reflector is formed on the driven member. Therefore, the installation space for the position detector can be made small, and thus the lens device can be made compact.

According to the actuator of the present invention, the driven member is held from both sides by the driving members, and therefore, the frictional forces of the driven member and the driving members are obtained stably, thus making it possible to move the driven member accurately. According to a control method of the actuator according to the present invention, the timings become equal among the plurality of piezoelectric elements on the occasion of a slow deforming speed of the piezoelectric elements, while on the occasion of a high deforming speed, the timings are made to differ among the plurality of piezoelectric elements. Therefore, moving and stopping of the driven member can be reliably performed, and the driven member can be accurately moved.

According to the method for controlling the actuator according to the present invention, voltage is applied so that the deforming speed differs at the time of extension and the time of contraction of the piezoelectric element, and the timings are equal among the plurality of piezoelectric elements on the occasion of the slow deforming speed, while on the occasion of the high deforming speed, the timings are made to differ among the plurality of piezoelectric elements. Therefore, the driven member can be accurately moved.

According to the actuator of the present invention, the frictional engaging surfaces of the driven member with the driving members, which are formed on both sides of the driven member, are not parallel, and therefore, rattle of the driven member and the driving members can be prevented by holding the driven member from both sides by the driving members.

According to the actuator of the present invention, the driving member and the driven member are brought into point contact or line contact, and therefore, substantially constant frictional forces can be applied between the driving members and the driven member, and the driven member can be always moved accurately.

Further, according to the lens device of the present invention, the position detector is provided by utilizing the driven member provided to extend in the driving direction. Therefore, the displacement amount of the lens device can be accurately measured, and the lens device can be made compact.

BRIEF DESCRIPTION OF THE DRAWINGS

FIG. 9 is a perspective view explaining a basic principle of an actuator provided with four piezoelectric elements;

DETAILED DESCRIPTION OF THE PREFERRED EMBODIMENTS

Hereinafter, preferred embodiments of an actuator and its control method, and a lens device according to the present invention will be explained with reference to the attached drawings.

Figure 1:
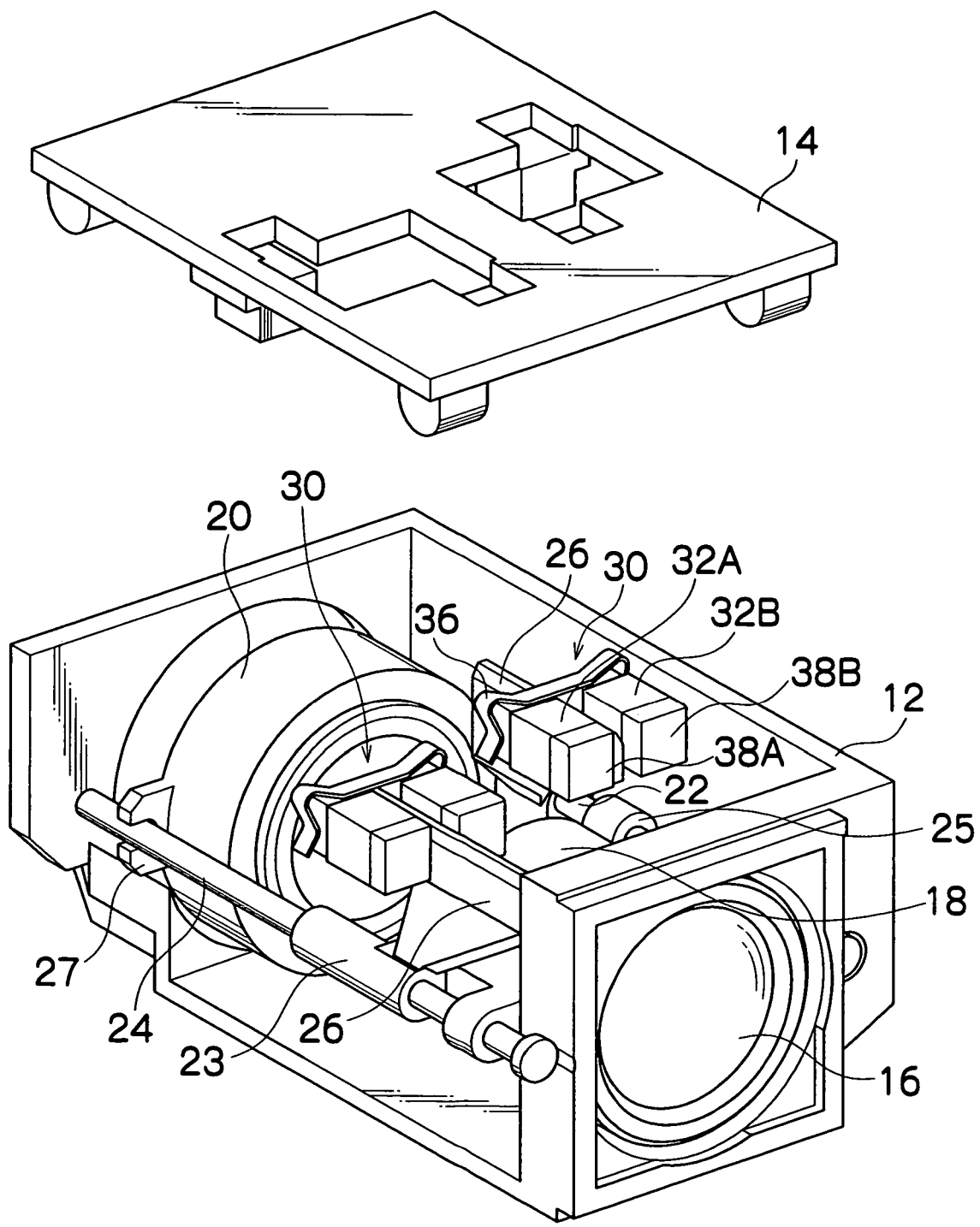
FIG. 1 is an exploded perspective view showing a construction of a lens device to which an actuator of a first embodiment is applied.

FIG. 1 is a perspective view showing a construction of the lens device to which an actuator of a first embodiment is applied. The lens device shown in the drawing has a box-shaped case constituted of a case body 12 and a lid 14, and a fixed lens 16 is mounted to a side surface of the case body 12.

Two lens frames 18 and 20 are provided inside the case body 12, and movable lenses such as a zoom lens and focus lens are held in these two lens frames 18 and 20. The two lens frames 18 and 20 are supported slidably in an optical axis direction by two guide rods 22 and 24 placed parallel with the optical axis of the fixed lens 16. Namely, a guide part 23 is formed to project on the outer peripheral surface of the lens frame 18. The guide rod 24 is inserted through a through-hole of this guide part 23 and guided, and the guide rod 22 is engaged in a U-shaped groove of an engagement part (not shown) formed to project on an opposite side from the guide part 23, whereby the lens frame 18 is supported slidably in the optical axis direction. Similarly, the guide part 25 is formed to project on an outer peripheral surface of the lens frame 20. The guide rod 22 is inserted through a through-hole of this guide part 25 and guided, and the guide rod 24 is engaged in the U-shaped groove of an engagement part 27 formed to project on the opposite side from the guide part 25, whereby the lens frame 20 is supported slidably in the optical axis direction.

Driven plates (corresponding to the driven members) 26 and 26 are integrally formed at the lens frames 18 and 20. The driven plate 26 is formed into an elongated rectangular shape, and its longitudinal direction is placed to be parallel with the optical axis. The material and the like of the driven plate 26 is not especially limited, and a material which is light and high in rigidity, for example, ceramics or the like is selected.

Actuators 30 and 30 are placed at the respective driven plates 26 and 26. Each of the actuators 30 and 30 is fixed by being fitted into an opening of the lid 14.

Figure 2:
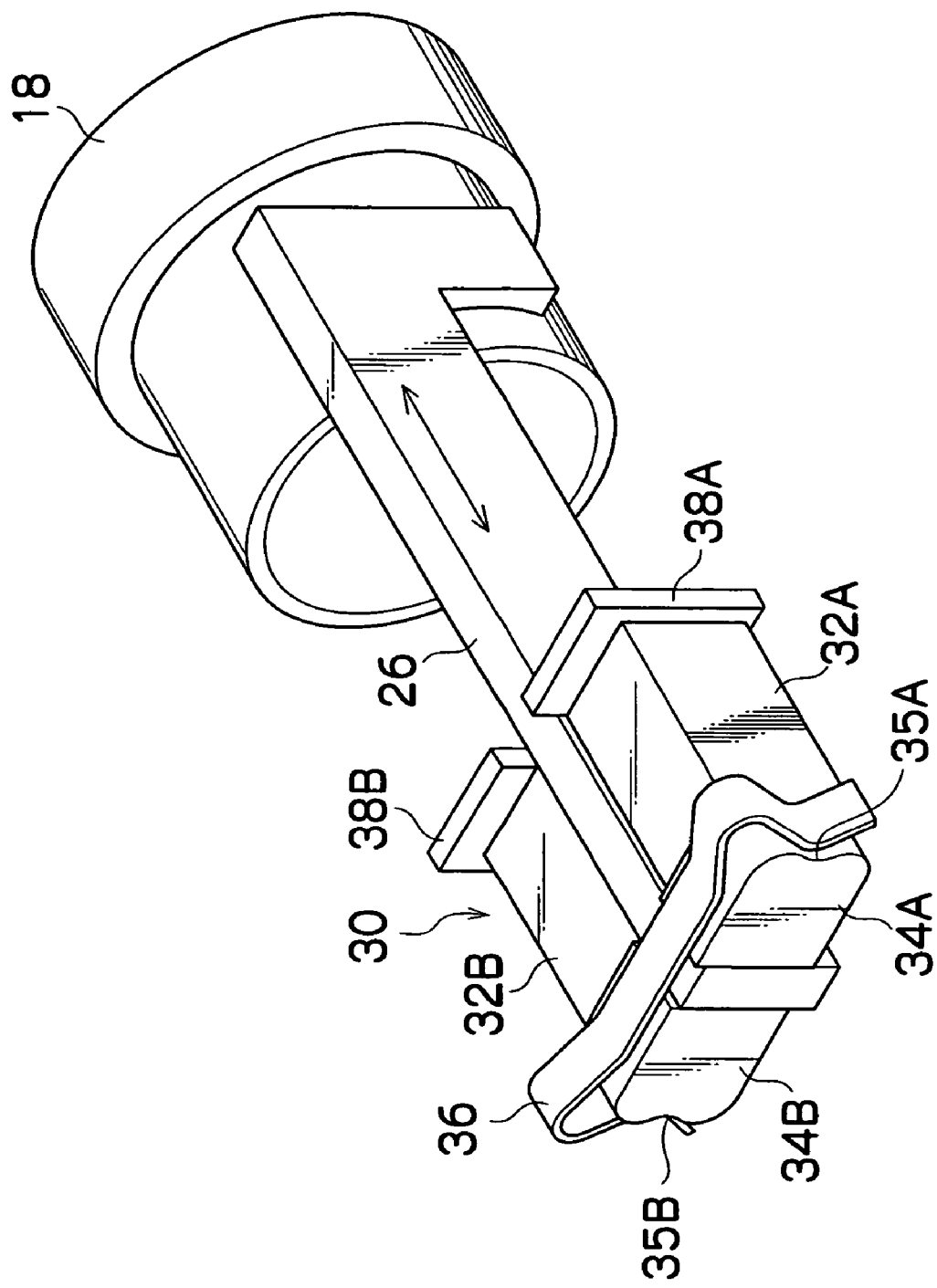
FIG. 2 is a perspective view explaining a basic structure of an actuator.

FIG. 2 is a perspective view for explaining a basic structure of the actuator 30. Hereinafter, the explanation will be made by an example of the actuator 30 which drives the lens frame 18, but the actuator 30 which drives the lens frame 20 is similarly constructed.

As shown in FIG. 2, the actuator 30 is mainly constructed by piezoelectric elements 32A and 32B, driving members 34A and 34B, a pressing spring (corresponding to an urging device) 36, and pressing plates 38A and 38B. The piezoelectric elements 32A and 32B are placed at both sides with the driven plate 26 therebetween. The piezoelectric elements 32A and 32B are placed so that their displacement directions are in a longitudinal direction of the driven plate 26 (namely, a driving direction). The pressing plates 38A and 38B which are fixed to the lid 14 (see FIG. 1) of the case are mounted to one end surfaces of the piezoelectric elements 32A and 32B in the displacement direction, and driving members 34A and 34B are integrally mounted to the other end surfaces. The driving members 34A and 34B are formed into substantially rectangular block shapes, and are constructed by a light material high in rigidity, for example, ceramics as the aforementioned driven plate 26. In the driving members 34A and 34B, dents 35A and 35B are formed on side surfaces at opposite sides from sides which are opposed to the driven plate 26, and the pressing spring 36 is engaged in these dents 35A and 35B. The pressing spring 36 is the plate spring which pinches the two driving members 34A and 34B, and the driving members 34A and 34B are pressed against the driven plate 26 by an urging force of this pressing spring 36. Thereby, the driving members 34A and 34B are frictionally engaged with the driven plate 26.

In FIG. 2, the example using the pressing spring 36 as the urging device which urges the driving members 34A and 34B to the driven plate 26 is shown, but the driving members 34A and 34B may be individually urged by the other urging devices, for example, elastic bodies such as a compression spring and rubber.

Figure 3A:
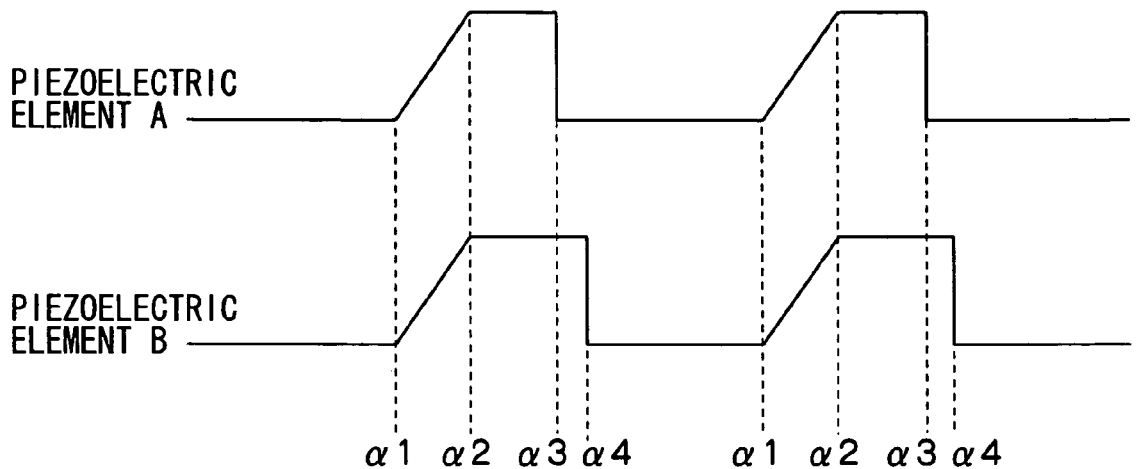
FIGS. 3A and 3B are waveform diagrams of driving pulses applied to piezoelectric elements in FIG. 1.
Figure 3B:
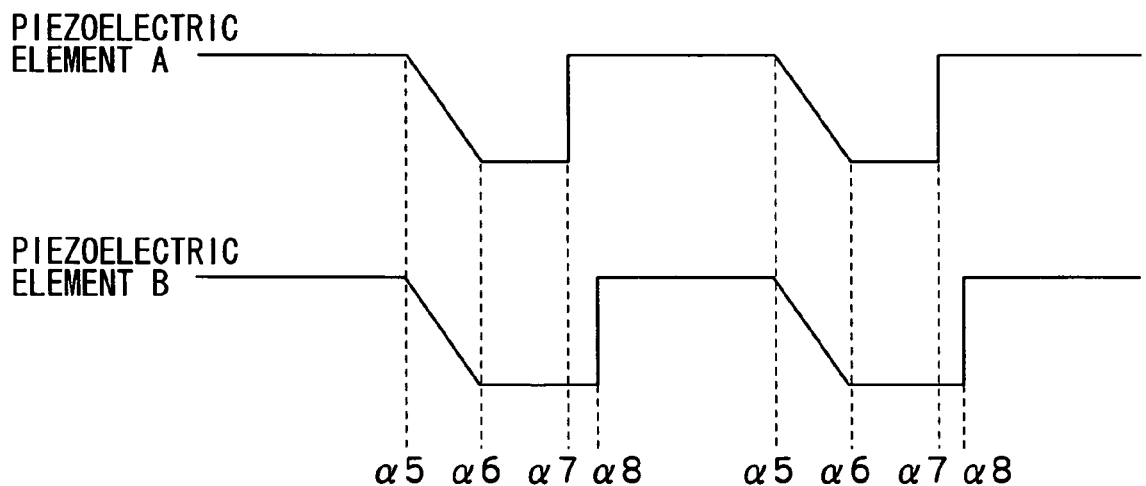

FIGS. 3A and 3B show the examples of the driving pulses which are applied to the piezoelectric elements 32A and 32B. FIG. 3A shows the driving pulse when the lens frame 18 in FIG. 2 is moved in the left direction, and FIG. 3B is the driving pulse when the lens frame 18 in FIG. 2 is moved in the right direction.

In the case of FIG. 3A, a substantially sawtooth-shaped driving pulse, which gradually rises from a time $\alpha 1$ to a time $\alpha 2$ and abruptly falls at a time $\alpha 3$, is applied to the piezoelectric element 32A. A substantially sawtooth-shaped driving pulse which gradually rises from the time $\alpha 1$ to the time $\alpha 2$ and abruptly falls at the time $\alpha 4$ is applied to the piezoelectric element 32B. Accordingly, the piezoelectric elements 32A and 32B gradually extend simultaneously from the time $\alpha 1$ to the time $\alpha 2$, and therefore, the driving members 34A and 34B in FIG. 2 gradually move in the left direction. Since the driving members 34A and 34B gradually move in this case, the driven plate 26 is held by the frictional force of the driving members 34A and 34B, and moves in the left direction with the driving members 34A and 34B. Meanwhile, at the time $\alpha 3$, only the piezoelectric element 32A abruptly contracts, and at the time $\alpha 4$, only the piezoelectric element 32B abruptly contracts. Accordingly, at the time $\alpha 3$ and the time $\alpha 4$, the driving members 34A and 34B in FIG. 2 abruptly and individually move in the right direction respectively. When the driving members 34A and 34B abruptly move like this, slip occurs between the driving members 34A and 34B and the driven plate 26, and only the driving members 34A and 34B move while the driven plate 26 stops. Therefore, at the time $\alpha 3$ and the time $\alpha 4$, the piezoelectric elements 32A and 32B can be returned to the original state by contracting them while the driven plate 26 is stopped. From the above, when the driving pulse in FIG. 3A is repeatedly applied, the driven plate 26 in FIG. 2 repeats moving in the left direction and stopping, and therefore, the lens frame 18 can be moved in the left direction.

In the case of FIG. 3B, a substantially sawtooth-shaped driving pulse which gradually falls from a time $\alpha 5$ to a time $\alpha 6$ and abruptly rises at a time $\alpha 7$ is applied to the piezoelectric element 32A. A substantially sawtooth-shaped driving pulse which gradually falls from the time $\alpha 5$ to the time $\alpha 6$, and abruptly rises at a time $\alpha 8$ is applied to the piezoelectric element 32B. Accordingly, the piezoelectric elements 32A and 32B gradually contract at the same time from the time α5 to the time α6, and therefore, the driving members 34A and 34B in FIG. 2 gradually move in the right direction. Since the driving members 34A and 34B gradually move in this case, the driven plate 26 is held by the frictional force of the driving members 34A and 34B, and move in the right direction with the driving members 34A and 34B. Meanwhile, at the time α7, only the piezoelectric element 32A abruptly extends, and at the time α8, only the piezoelectric element 32B abruptly extends. Accordingly, at the time α7 and the time α8, the driving members 34A and 34B in FIG. 2 abruptly move in the left direction individually. When the driving members 34A and 34B abruptly move like this, slip occurs between the driving members 34A and 34B, and the driven plate 26, and only the driving members 34A and 34B move while the driven plate 26 stops. Therefore, at the time α7 and the time α8, the piezoelectric elements 32A and 32B can be returned to the original state by extending them while the driven plate 26 is stopped. From the above, when the driving pulse in FIG. 3B is repeatedly applied, the driven plate 26 in FIG. 2 repeats moving in the right direction and stopping, and therefore, the lens frame 18 can be moved in the right direction.

When the voltage is controlled as described above, the timing in which the piezoelectric element 32A abruptly deforms and the timing in which the piezoelectric element 32B abruptly deforms are slightly deviated. Namely, in the case of FIG. 3A, the piezoelectric element 32A abruptly contracts at the time α3, and a little later, the piezoelectric element 32B abruptly contracts at the time α4. Similarly, in the case of FIG. 3B, the piezoelectric element 32A abruptly extends at the time α7, and a little later, the piezoelectric element 32B extends at the time α8. Accordingly, the driving member 34B stops when the driving member 34A abruptly moves, and when the driving member 34B abruptly moves, the driving member 34A stops. Therefore, the driven plate 26 is difficult to move following the driving members 34A and 34B, and thus the driven plate 26 can be reliably stopped. Therefore, movement and stoppage of the driven plate 26 can be reliably controlled by applying the voltage as the above described driving pulse, and the drive control of the driven plate 26 can be accurately performed.

When the control is performed as described above, the difference in the driving force at the time of moving and stopping of the driven plate 26 becomes large, and therefore, the unstable factor in the drive control decreases, thus making it possible to facilitate setting of the frictional force of the driven plate 26 and the driving members 34A and 34B. Therefore, the control of the driven plate 26 can be performed stably and reliably.

According to the aforementioned embodiment, when the driven plate 26 is moved with the driving members 34A and 34B, the driving members 34A and 34B are moved simultaneously by simultaneously applying voltage to the piezoelectric elements 32A and 32B, and therefore, the driven plate 26 is driven with a large driving force while it is held by the driving members 34A and 34B at both sides. Accordingly, when the weight of the lens frame 18 mounted to the driven plate 26 is large, the driven plate 26 can be reliably moved.

According to this embodiment, the piezoelectric elements 32A and 32B and the driving members 34A and 34B are placed at both sides of the driven plate 26 so that the driven plate 26 is held with the driving members 34A and 34B, and therefore, the frictional force of the driven plate 26 and the driving members 34A and 34B is stably obtained. Namely, the driven plate 26 is held by the driving members 34A and 34B from both sides, and hence, when the driven plate 26 moves, there is no possibility of the frictional force of the driven plate 26 and the driving members 34A and 34B varying, thus making it possible to move the driven plate 26 stably and accurately.

Further, according to this embodiment, the structure in which the driven plate 26 is provided to extend in the driving direction and the frictional engaging surfaces of the driving members 34A and 34B and the driven plate 26 are always held in a constant positional relation with respect to the piezoelectric elements 32A and 32B is provided, and therefore, the aforesaid frictional engaging surfaces can be always located in the vicinity of the piezoelectric elements 32A and 32B. Therefore, the vibrations of the piezoelectric elements 32A and 32B can be reliably transmitted to the driven plate 26, and control by the driving pulse at a high frequency becomes possible. As a result, the driven plate 26 can be moved at a high speed even at a low voltage.

Figure 4A:
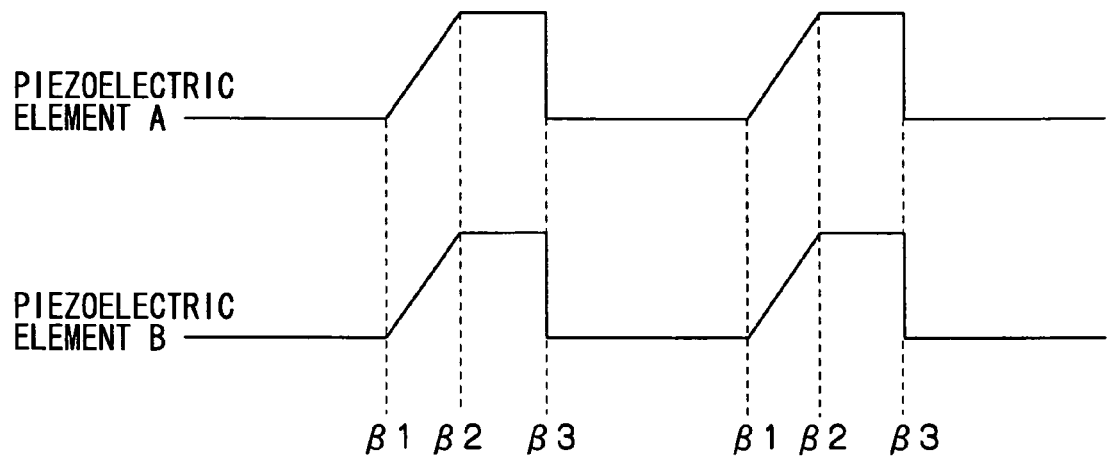
FIGS. 4A and 4B are waveform diagrams of different driving pulses from FIGS. 3A and 3B.
Figure 4B:
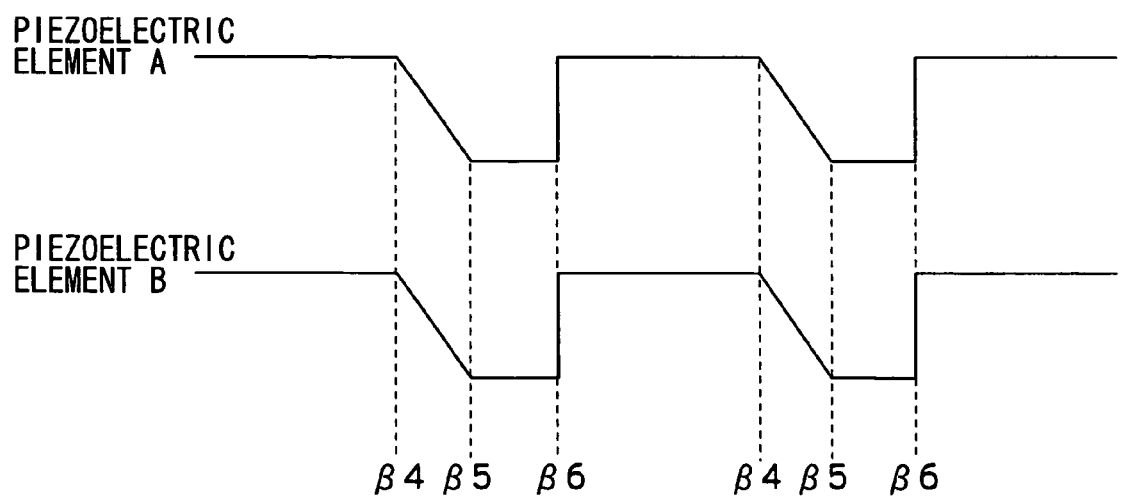

The shapes of the waveforms of the driving pulses applied to the piezoelectric elements 32A and 32B are not limited to the aforementioned example of the rectangular shape. For example, as shown in FIGS. 4A and 4B, the driving pulses in the same shape may be simultaneously applied to the piezoelectric elements 32A and 32B. In FIG. 4A, substantially sawtooth-shaped driving pulses which gradually rise from a time β1 to a time β2, and abruptly fall at a time β3 are applied to the piezoelectric elements 32A and 32B. In FIG. 4B, substantially sawtooth-shaped driving pulses which gradually fall from a time β4 to a time β5, and abruptly rises at a time β6 are applied to the piezoelectric elements 32A and 32B. The piezoelectric elements 32A and 32B may abruptly deform in the same timing in this manner.

As the use of the actuator of the present invention, it can be applied to compact precision apparatuses such as a digital camera and a cellular phone, for example. The cellular phones especially need to be driven at a low voltage of 3 V or lower. However, by using the actuator of the present invention, the cellular phones can be driven at a high frequency of about 20 kHz, and the lens frames 18 and 20 can be moved at a high speed of 2 mm/s or higher. Therefore, even the zoom lens requiring movement of about 10 mm can be moved quickly.

Figure 5:
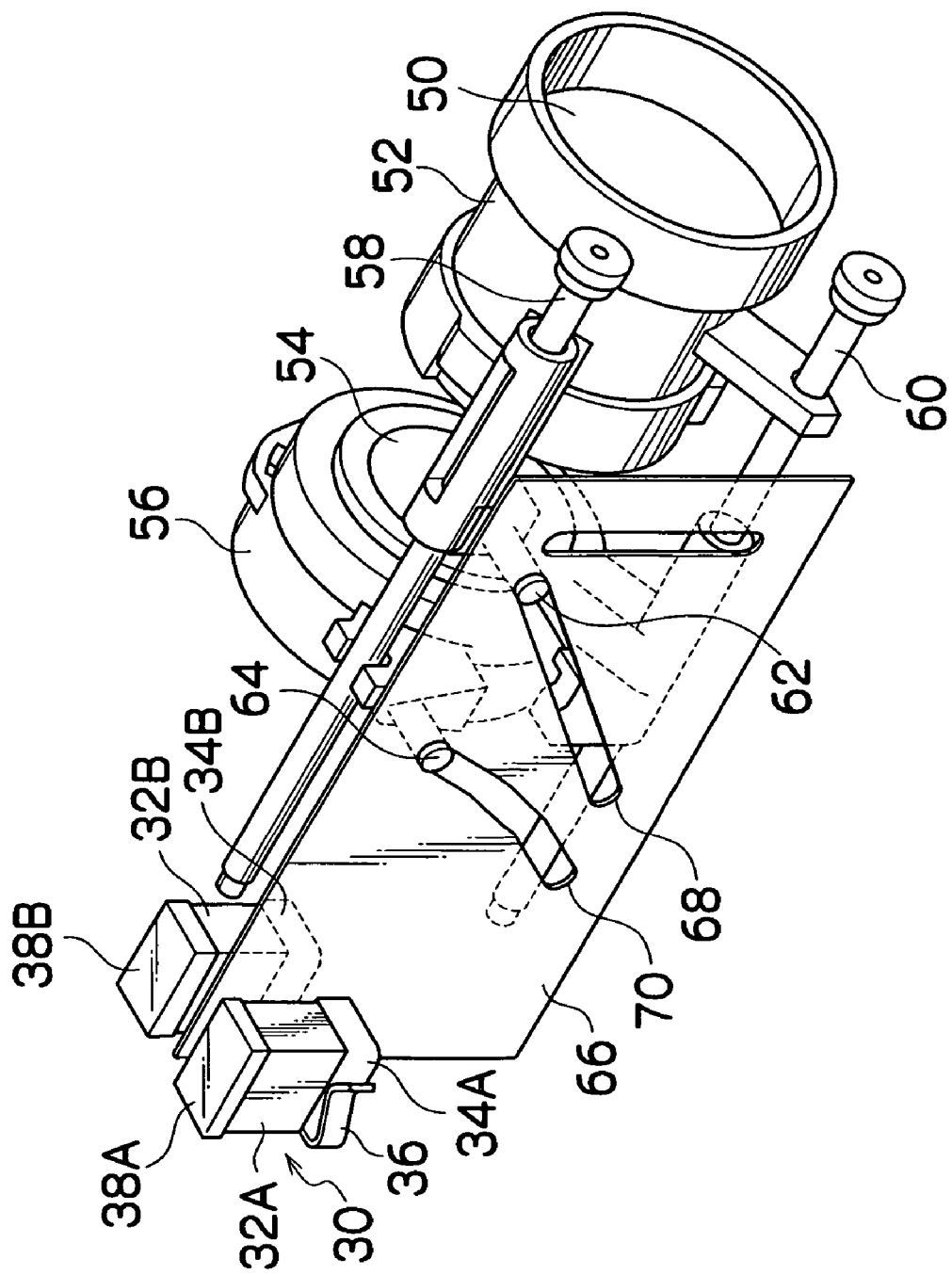
FIG. 5 is a perspective view showing a main construction of a different lens device from FIG. 1.

The aforementioned embodiment is explained with the example in which the driven member is driven in the optical axis direction, but the driving direction of the driven member is not limited to this. For example, the lens device shown in FIG. 5 is the example in which the driven member is driven in the direction perpendicular to the optical axis. This lens device includes a lens frame 52 which holds a lens group including a movable lens 50, and a lens frame 56 which holds a lens group including a movable lens 54. The lens frame 52 and 56 are slidably supported by two guide rods 58 and 60 placed in the optical axis direction. The respective lens frames 52 and 56 are provided with cam pins 62 and 64, and these cam pins 62 and 64 are engaged in cam grooves 68 and 70 which are formed in a movable plate 66. The movable plate 66 is slidably supported in an up-and-down direction in FIG. 5 (namely, the direction orthogonal to the optical axis), and an actuator 30 is mounted to this movable plate 66. The piezoelectric elements 32A and 32B of the actuator 30 are provided at both sides with the movable plate 66 therebetween, and is placed to extend and contract in the up-and-down direction. The driving members 34A and 34B are mounted to the lower sides of the piezoelectric elements 34A and 34B. The pressing spring 36 is mounted to the driving members 34A and 34B, and the driving members 34A and 34B are frictionally engaged with the movable plate 66 by the urging force of the pressing spring 36. Accordingly, when the voltage of the aforementioned driving pulses is applied to the piezoelectric elements 34A and 34B, the movable plate 66 is driven in the up-and-down direction, and the lens frames 52 and 56 are moved forward and backward in the optical axis direction. In the lens device constructed as described above, the driving members 34A and 34B are also frictionally engaged from both sides of the movable plate 66, and therefore, the movable plate 66 can be moved stably and accurately.

Figure 6:
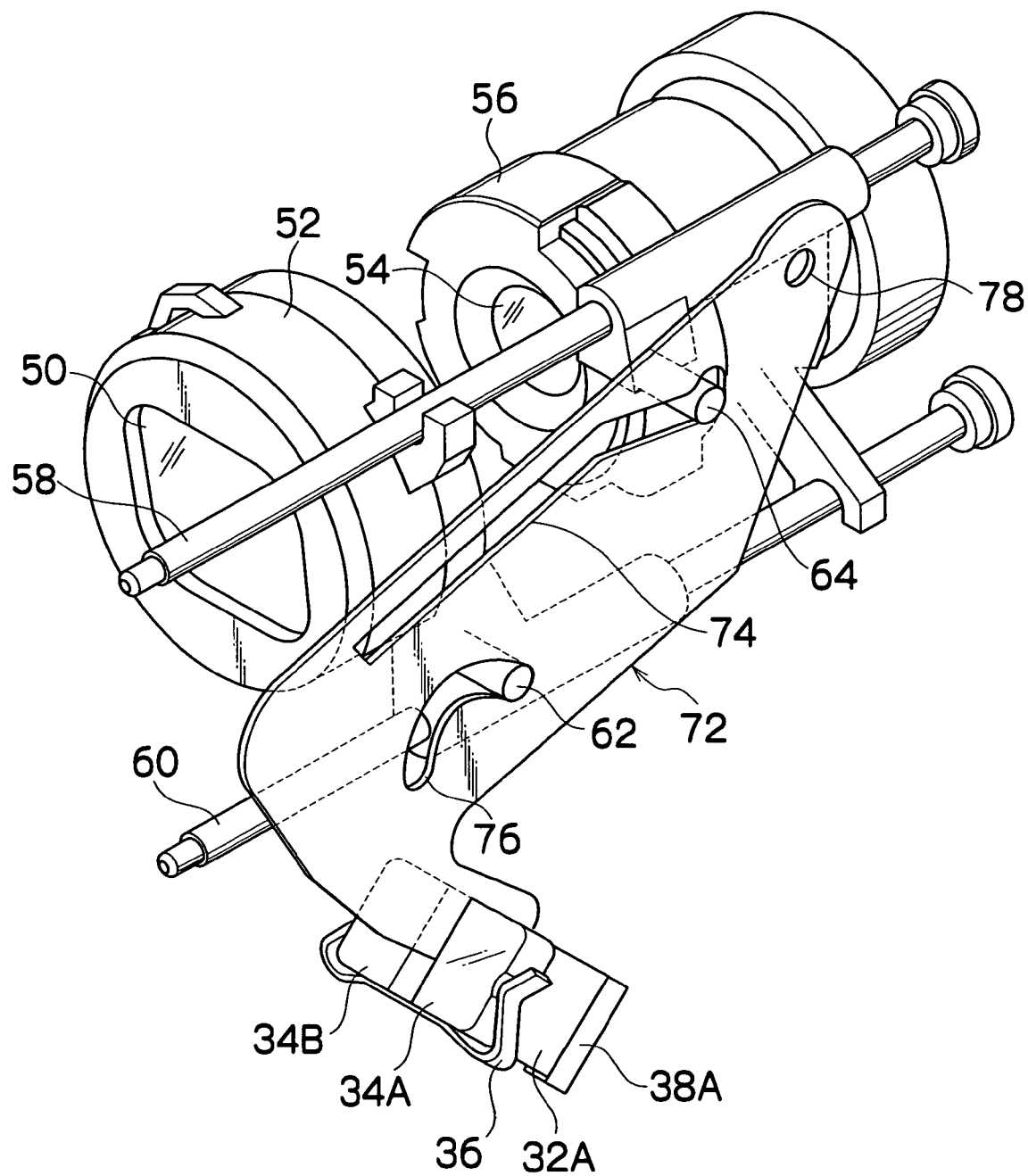
FIG. 6 is a perspective view showing a main construction of a different lens device from FIG. 1.

In the lens device shown in FIG. 6, the cam pins 62 and 64 which are formed at the lens frames 52 and 56 are engaged in cam grooves 74 and 76 which are formed in a swing plate 72. A hole 78 is formed in the swing plate 72, and the swing plate 72 is swingably supported via a shaft member (not shown) which is inserted through this hole 78. In the actuator 30, the driving members 34A and 34B are placed at both sides with the swing plate 72 therebetween, and are frictionally engaged with the swing plate 72 from both sides by the pressing spring 36. Thereby, the swing plate 72 can be moved stably and accurately.

Figure 7:
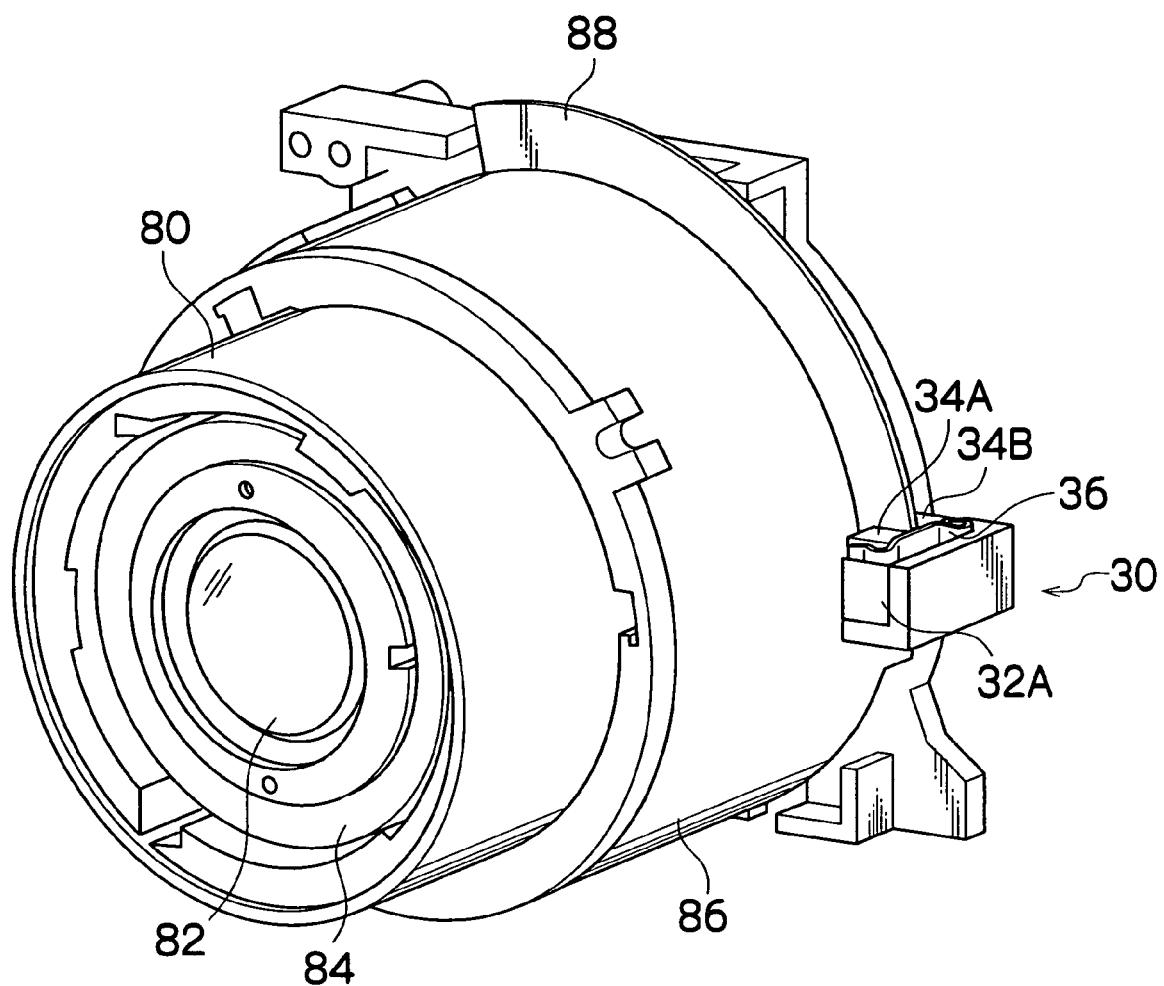
FIG. 7 is a perspective view showing a main construction of a different lens device from FIG. 1.

The lens device shown in FIG. 7 has a fixed barrel 80, and a lens frame 84 of a movable lens 82 is supported slidably in the optical direction inside this fixed barrel 80. A driving barrel 86 is rotatably supported at an outer part of the fixed barrel 80, and by rotationally operating this driving barrel 86, the lens frame 84 is moved forward and backward in the optical axis direction. A flange 88 is formed at the driving barrel 86, and the actuator 30 is mounted to the flange 88. In the actuator 30, the driving members 34A and 34B are placed at both sides with the flange 88 therebetween, and are frictionally engaged with the flange 88 from both sides by the pressing spring 36. Thereby, the driving barrel 86 can be rotated stably and accurately.

Next, a second embodiment of the actuator according to the present invention will be explained. In the second embodiment, a lens device is constructed as shown in FIG. 1, and a basic structure is formed as shown in FIG. 2, as in the first embodiment. A control part is constructed as shown in FIG. 8.

Figure 8:
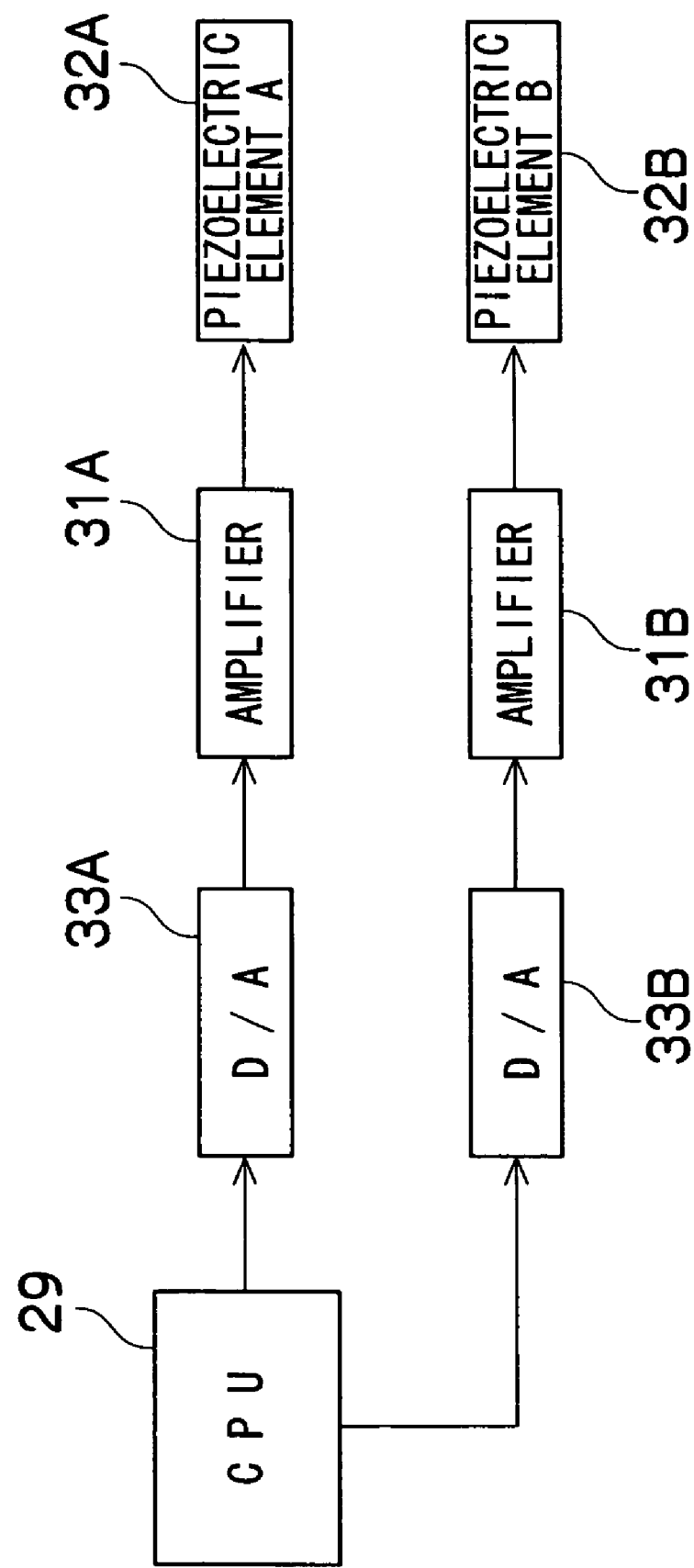
FIG. 8 is a block diagram showing a configuration of a control part in an actuator of a second embodiment.

FIG. 8 is a block diagram showing a construction of the control part which applies voltage to the piezoelectric elements 32A and 32B in a predetermined timing. As shown in the drawing, amplifiers 31A and 31B are connected to the piezoelectric elements 32A and 32B, and are further connected to a CPU 29 via D/A converters 33A and 33B. The CPU 29 outputs a control signal in a predetermined timing, and after this signal is subjected to D/A conversion in the D/A converters 33A and 33B, it is amplified in the amplifiers 31A and 31B, whereby driving pulse signals with rectangular waves are generated. The driving pulse signal of the piezoelectric element 32A and the driving pulse signal of the piezoelectric element 32B are generated as rectangular waves which are equal in the timing of one of the rising edge and the falling edge, and are different in the timing of the other of the rising edge and the falling edge. For example, the driving pulse signals shown in the aforementioned FIG. 3A and FIG. 3B are generated, and are applied to the piezoelectric elements 32A and 32B.

Next, an operation of the actuator of the second embodiment will be explained.

A comparative example in which voltage is applied to the piezoelectric elements 32A and 32B of the actuator 30 shown in FIGS. 1 and 2 in the substantially sawtooth shapes shown in FIG. 4A and FIG. 4B will be explained hereinafter.

In the case of FIG. 4A, the driving pulses in the same shape, namely, the substantially sawtooth-shaped driving pulses which gradually rise from the time β1 to the time β2, and abruptly falls at the time β3 are applied to the piezoelectric elements 32A and 32B. Accordingly, at the time β3, the piezoelectric elements 32A and 32B abruptly contract in the same timing.

Likewise, in the case of FIG. 4B, the driving pulses in the same shape, namely, the substantially sawtooth-shaped driving pulses which gradually fall from the time β4 to the time β5, and abruptly rise at the time β6 are applied to the piezoelectric elements 32A and 323B. Accordingly, at the time β6, the piezoelectric elements 32A and 32B abruptly extend in the same timing.

When the piezoelectric elements 32A and 32B abruptly deform in the same timing like this, the driving members 34A and 34B simultaneously move while they are holding the driven plate 26, and therefore, the driven plate 26 easily move with the driving members 34A and 34B. Accordingly, it is necessary to set the deforming speeds at the extension time and contraction time of the piezoelectric elements 32A and 32B precisely, or set the frictional forces of the driven plate 26 and the driving members 34A and 34B precisely in order to stop the driven plate 26 reliably. Accordingly, it is extremely difficult to select the pulse shape and the spring constant of the pressing spring 36. When selection of the pulse shape and selection of the spring constant of the pressing spring 36 are not accurately performed, the driven plate 26 moves at both the extension time and contraction time of the piezoelectric elements 32A and 32B, and the driven plate 26 cannot be accurately moved.

On the other hand, in the second embodiment, the timings in which the two piezoelectric elements 32A and 32B are abruptly deformed are deviated from each other in the two piezoelectric elements 32A and 32B as shown in the time α3 and the time α4 in FIG. 3A, or the time α7 and the time α8 in FIG. 3B. Accordingly, when the driving member 34A moves, the driving member 34B stops, and when the driving member 34B moves, the driving member 34A stops. Therefore, the driven plate 26 is difficult to move following the driving members 34A and 34B, and the driven plate 26 can be reliably stopped. Thus, the voltage in the pulse shape in FIG. 3A and FIG. 3B is applied to the piezoelectric elements 32A and 32B, whereby moving and stoppage of the driven plate 26 can be reliably controlled, and the drive control of the driven plate 26 is accurately performed.

When the control is performed as described above, the difference in the driving force at the moving time and stopping time of the driven plate 26 becomes large, and therefore, the unstable factor in the drive control decreases, thus making it possible to facilitate setting of the frictional force of the driven plate 26 and the driving members 34A and 34B. Therefore, the control of the driven plate 26 can be performed stably and reliably.

Further, according to this embodiment, the structure in which the driven plate 26 is provided to extend in the driving direction, and the frictional engaging surfaces of the driving members 34A and 34B and the driven plate 26 are always kept in the constant positional relation with respect to the piezoelectric elements 32A and 32B is provided, and therefore, the aforesaid frictional engaging surfaces can be placed in the vicinity of the piezoelectric elements 32A and 32B. Thereby, the vibrations of the piezoelectric elements 32A and 32B can be reliably transmitted to the driven plate 26, and the control by the driving pulse at a high frequency is made possible. Therefore, the driven plate 26 can be moved at a high speed even at a low voltage.

In the aforementioned second embodiment, the construction of the lens device shown in FIG. 5 may be also adopted.

In this case, the movable plate 66 can be moved stably and accurately by applying the voltage in the pulse shape shown in FIG. 3A and FIG. 3B.

In the second embodiment, the construction of the lens device shown in FIG. 6 may be adopted. In this case, the swing plate 72 can be moved in the swing direction stably and accurately by applying the voltage in the pulse shape shown in FIG. 3A and FIG. 3B.

Further, the construction of the lens device shown in FIG. 7 may be adopted. In this case, the drive barrel 86 can be moved in the rotating direction stably and accurately by applying the voltage in the pulse shape shown in FIG. 3A and FIG. 3B.

Figure 10A:
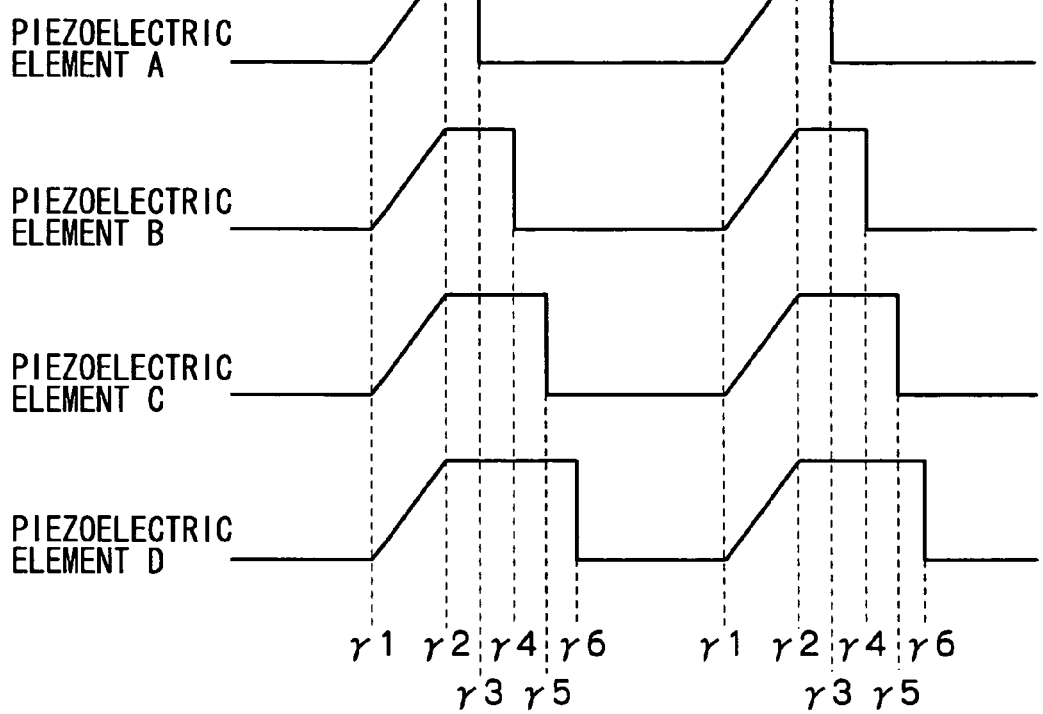
FIGS. 10A and 10B are waveform diagrams of driving pulses applied to the piezoelectric elements in FIG. 9.
Figure 10B:
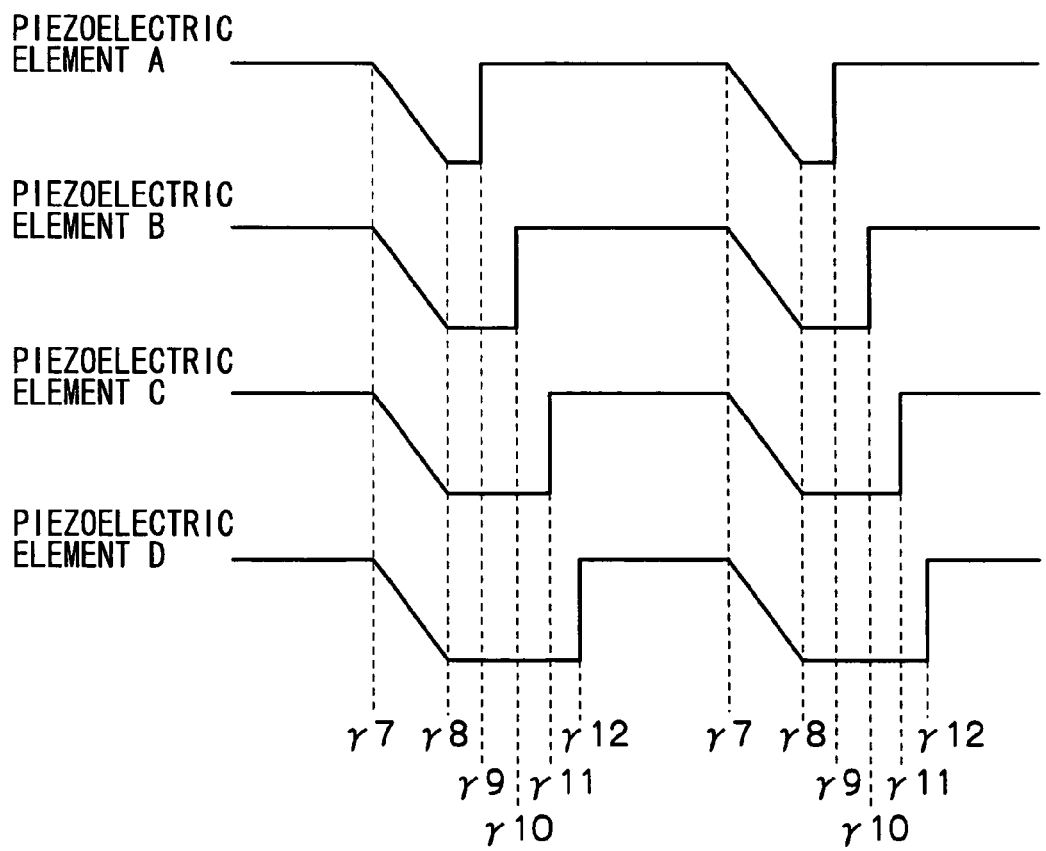

In the aforementioned second embodiment, the example provided with the two piezoelectric elements 32A and 32B is shown, but three or more piezoelectric elements may be provided. For example, in FIG. 9, the example provided with four piezoelectric elements 32A to 32D is shown. The piezoelectric elements 32A and 32C are placed at the opposite side from the piezoelectric elements 32B and 32D with respect to the driven plate 26. The driving members 34A to 34D are integrally mounted to the four piezoelectric elements 32A and 32D, and the driving members 34A to 34D are urged by the pressing springs 26 and 26, and frictionally engaged with the driven plate 26. Driving pulses as shown in FIG. 10A and FIG. 10B are applied to the four piezoelectric elements 32A to 32D. Namely, in the case of FIG. 10A, substantially sawtooth-shaped driving pulses, which gradually rise simultaneously from a time γ1 to a time γ2 and abruptly fall from a time γ3 to a time γ6 with the timings shifted are applied to the piezoelectric elements 32A to 32D. Similarly, in the case of FIG. 10B, substantially sawtooth-shaped driving pulses which gradually rise simultaneously from a time γ7 to a time γ8 and abruptly rise at a time γ9 to a time γ12 with the timings shifted are applied to the piezoelectric elements 32A to 32D. Accurate drive control can be also performed when four piezoelectric elements 32A to 32D are used by shifting the timings in which the piezoelectric elements 32A to 32D are abruptly deformed like this.

Next, an actuator of a third embodiment will be explained.

Figure 11:
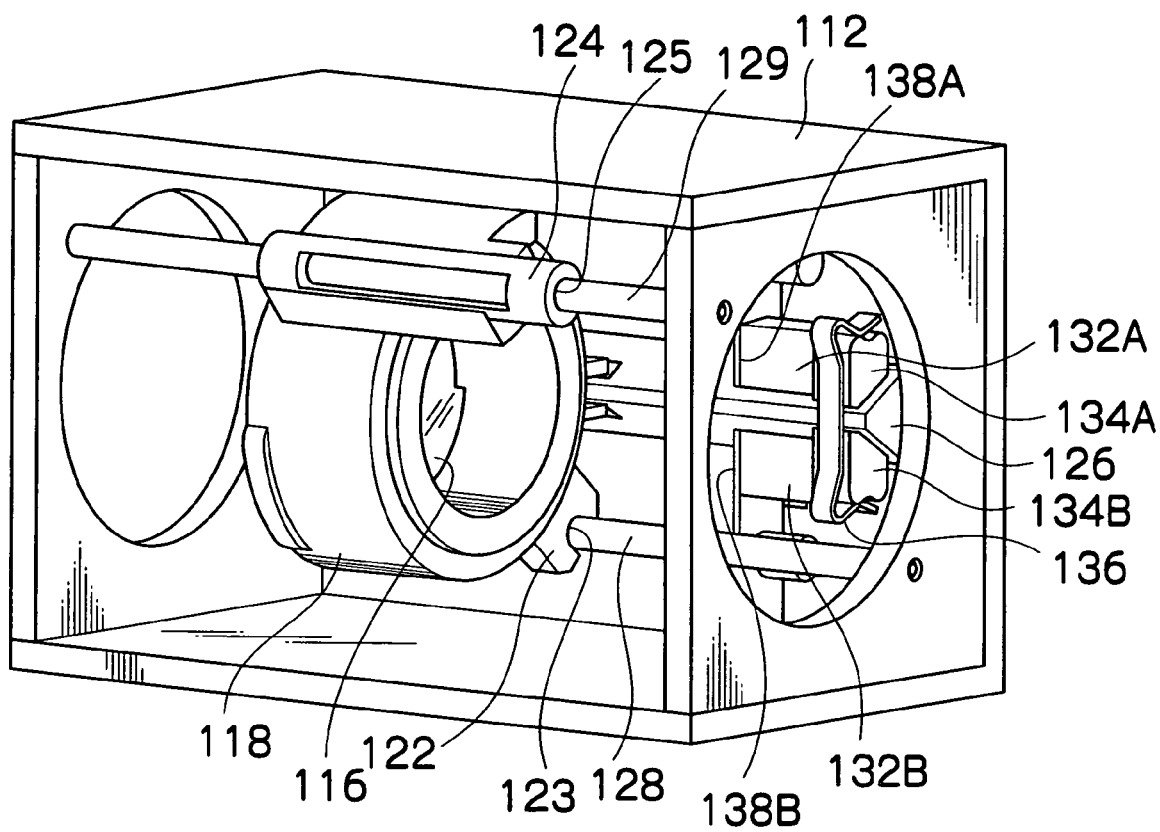
FIG. 11 is a perspective view showing a construction of a lens device to which an actuator of a third embodiment is applied.

FIG. 11 is a perspective view showing a construction of a lens device to which the actuator of the third embodiment is applied. The lens device shown in the drawing has a box-shaped case 112, and a lens frame 118 which holds a movable lens (for example, a zoom lens and a focus lens) 116 is provided inside this case 112.

An engaging part 122 and a guide part 124 are formed to project on an outer peripheral surface of the lens frame 118. A U-shaped groove 123 is formed in the engaging part 122 and a guide rod 128 is engaged in this groove 123. A through-hole 125 is formed in the guide part 124, and a guide rod 129 is inserted through the through-hole 125. The guide rods 128 and 129 are placed in the optical axis direction, and are fixed to the case 112. Thereby, the lens frame 118 is supported slidably in the optical axis direction.

Figure 12:
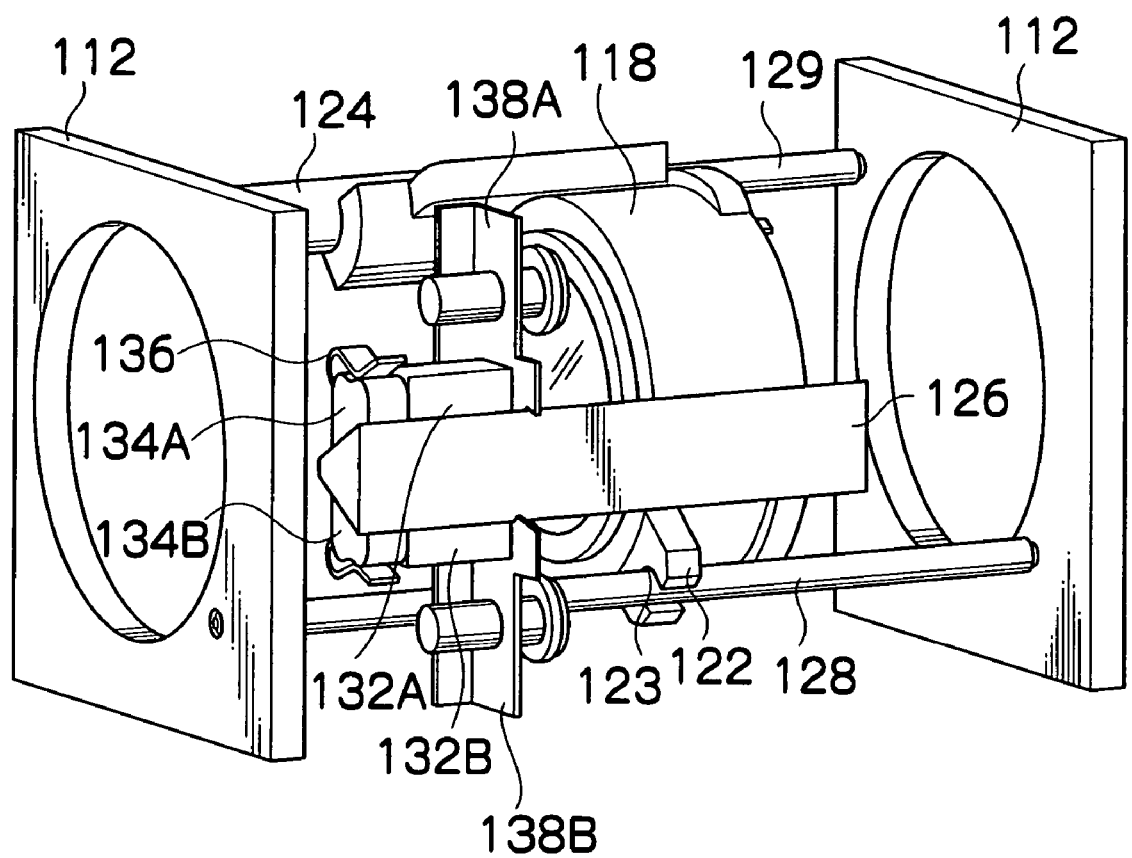
FIG. 12 is an exploded perspective view explaining the actuator in FIG. 11.

A driven member 126 is integrally mounted to the lens frame 118. The driven member 126 is formed into a triangle pole shape as shown in FIG. 12, and its longitudinal direction is placed to be parallel with the optical axis. The material of the driven member 126 is not especially limited, but a light material with high rigidity, for example, ceramics or the like is selected.

The actuator of this embodiment is constructed mainly by piezoelectric elements 132A and 132B, driving members 134A and 134B, and a pressing spring 136. The piezoelectric elements 132A and 132B are placed at both sides with the driven member 126 therebetween. The piezoelectric elements 132A and 132B are placed so that their displacement directions are in the longitudinal direction (namely, the driving direction) of the driven member 126. One end surfaces in the displacement direction of the piezoelectric elements 132A and 132B are mounted to pressing plates 138A and 138B which are fixed to the case 112 (see FIG. 11). The driving members 134A and 134B are integrally mounted to the other end surface in the displacement direction. The driving members 134A and 134B are formed into the block shape with their sections in a substantially trapezoidal pole shape, and are constructed by a light material with high rigidity, for example, ceramics as the aforementioned driven member 126. In the aforementioned driving members 134A and 134B, dents 135A and 135B are formed on the side surfaces at opposite sides from the side opposed to the driven member 126, and the pressing spring 136 is engaged in the dents 135A and 135B. The pressing spring 136 is the plate spring which pinches the two driving members 134A and 134B, and the driving members 134A and 134B are pressed against the side surfaces of the driven plate 126 by the urging force of this pressing spring 136. Thereby, the driving members 134A and 134B are frictionally engaged with the driven member 126. The example using the pressing spring 136 as the urging device which urges the driving members 134A and 134B to the driven member 126 is shown in FIG. 12, but the driving members 134A and 134B may be urged individually by other urging devices, for example, an elastic body such as a compression spring and rubber.

The voltage of the driving pulses shown in FIGS. 3A and 3B, for example, are applied to the piezoelectric elements 132A and 132B.

Next, an operation of the actuator constructed as described above will be explained.

Figure 13:
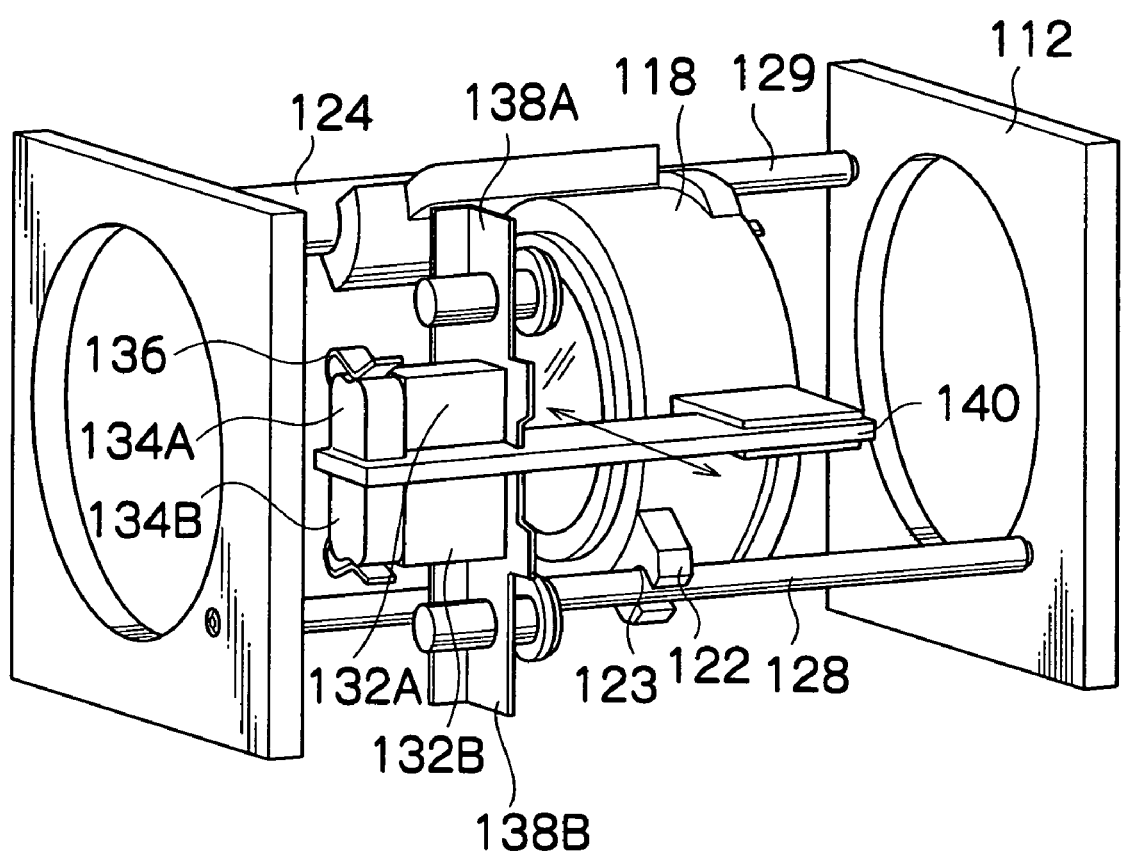
FIG. 13 is an exploded perspective view showing a comparative example with a shape of a driven member differing from that of FIG. 12.

A comparative example using a plate-shaped driven member instead of the driven member 126 in the shape of the triangle pole in FIG. 12 is shown in FIG. 13. In the comparative example shown in FIG. 13, a driven member 140 is formed into a rectangular plate shape. The piezoelectric elements 132A and 132B and the driving members 134A and 134B are respectively placed at both sides of the driven member 140 one by one. The driving members 134A and 134B are urged to the driven member 140 by the pressing spring 136, and the driving members 134A and 134B are frictionally engaged with the driven member 140.

In the case of the actuator shown in FIG. 13, the frictional engaging surfaces of the driving member 134A and the driven member 140 and the frictional engaging surfaces of the driving member 134B and the driven member 140 are in the parallel positional relation. Therefore, even if the driving members 134A and 134B are urged to the driven member 140 by the pressing spring 136, there is the possibility of the driven member 140 rattling in the arrow direction in FIG. 13 (namely, the direction orthogonal to the holding direction by the driving members 134A and 134B). When the driven member 140 (namely, the lens frame 118) rattles, there arises the problem of the optical performance being lowered.

On the other hand, in the actuator of this embodiment, the driven member 126 is formed into the triangle pole shape as shown in FIG. 12, and the driving members 134A and 134B presses the two side surfaces of the driven member 126. Namely, the two frictional engaging surfaces formed at both sides of the driven member 126 are in the parallel positional relation. Accordingly, the driven member 126 is positioned by being pressed from the two directions on the surfaces orthogonal to the optical axis. Thereby, the driven member 126 can be prevented from rattling to lower the optical performance.

In the actuator of this embodiment, the driven member 126 is provided to extend in the driving direction, and therefore, the frictional engaging surfaces of the driven member 126 and the driving members 134A and 134B are always kept in the constant positional relation with respect to the piezoelectric elements 132A and 132B. Accordingly, the frictional engaging surfaces can be always placed in the vicinity of the piezoelectric elements 132A and 132B. Thereby, the vibrations of the piezoelectric elements 132A and 132B do not attenuate at the driving members 134A and 134B and are transmitted to the driven member 126, and therefore, when the driving pulses at a high frequency are applied to the piezoelectric elements 132A and 132B, the driven member 126 can be reliably moved. Therefore, even at a low voltage, the driven member 126 can be moved at a high speed.

Further, according to this embodiment, a plurality of piezoelectric elements 132A and 132B and the driving members 134A and 134B are provided, and therefore, high output power is obtained, and when the driven member 126 (lens frame 118) is heavy, it can be reliably moved.

Figure 14A:
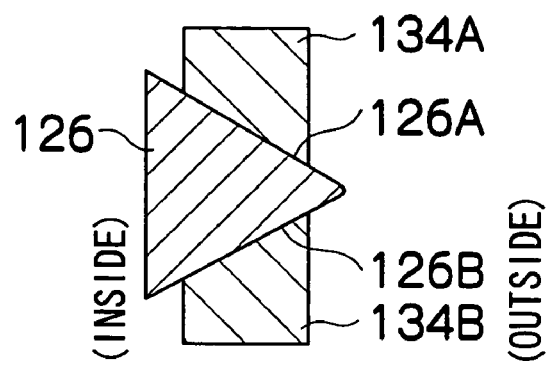
FIGS. 14A to 14D are views showing examples of shapes of the driven members.
Figure 14B:
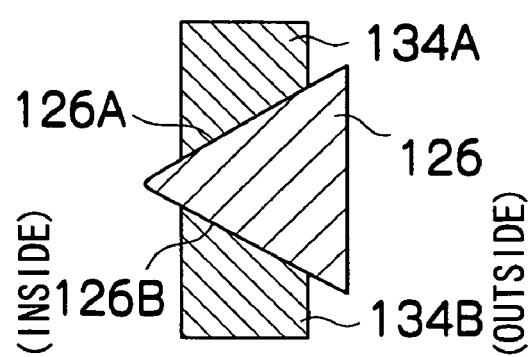
Figure 14C:
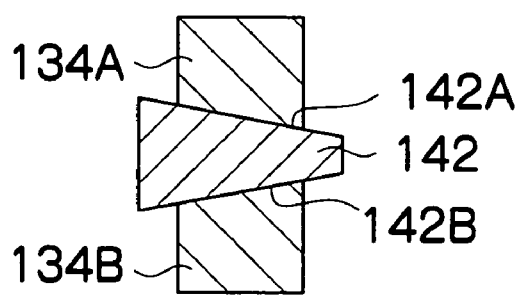
Figure 14D:
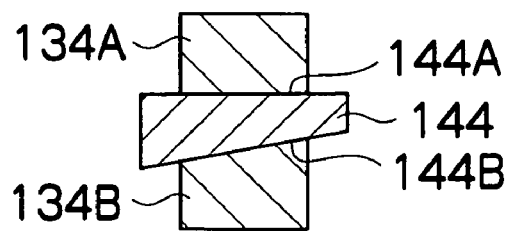

In the aforementioned embodiment, the driven member 126 is formed into a triangle pole shape, but the shape of the driven member 126 is not limited to this, and it may be in any shape if only the frictional engaging surfaces at both sides are not parallel. FIGS. 14A to 14D are the examples showing various shapes of the driven members, and each of the driven members shows the section orthogonal to the driving direction. FIG. 14A shows the section of the driven member 126 in FIG. 12. The section of the driven member 126 is formed into the shape of the triangle pole, and is placed with the right side in the drawing (outer side of the lens frame 118) as the vertex. In this case, surfaces 126A and 126B with which the driving members 134A and 134B are respectively frictionally engaged are in the positional relation in which they are not parallel (namely, intersect). FIG. 14B shows the orientation of the driven member 126 in FIG. 14A being changed, and the sectional shape of this driven member 126 is formed into a triangular shape with the left side of the drawing (inner side of the lens frame 118) as the vertex. In this case, the side surfaces 126A and 126B of the driven member 126 are in the positional relation which is not parallel. The sectional shape of the driven member 142 shown in FIG. 14C is trapezoidal and the driving members 134A and 134B are frictionally engaged with both inclined side surfaces 142A and 142B. In this case, both side surfaces 142A and 142B are in the positional relation which is not parallel. The sectional shape of the driven member 144 shown in FIG. 14D is a trapezoid with one side surface 142B of the rectangle inclined. In this case, both the side surfaces 144A and 144B are in the positional relation which is not parallel. As described above, in the driven members 126, 142 and 144 of various sectional shapes, occurrence of rattle can be inhibited.

In the aforementioned third embodiment, the explanation is made with the example in which the voltage is applied to the piezoelectric elements 132A and 132B in this sequence, but the voltage may be applied to the piezoelectric elements 132B and 132A in this sequence.

In the third embodiment, the shapes of the waveforms of the driving pulses which are applied to the piezoelectric elements 132A and 132B are not limited to the aforementioned example of the rectangular shape. For example, as shown in FIGS. 4A and 4B, the driving pulses in the same shape may be simultaneously applied to the piezoelectric elements 132A and 132B.

Next, actuators of the fourth to the seventh embodiments will be explained. In the fourth to the seventh embodiments, the lens devices are constructed as in the first embodiment shown in FIG. 1. Hereinafter, the members with the same constructions as in the first embodiment are explained by assigning the same reference numerals and characters to them.

Figure 15:
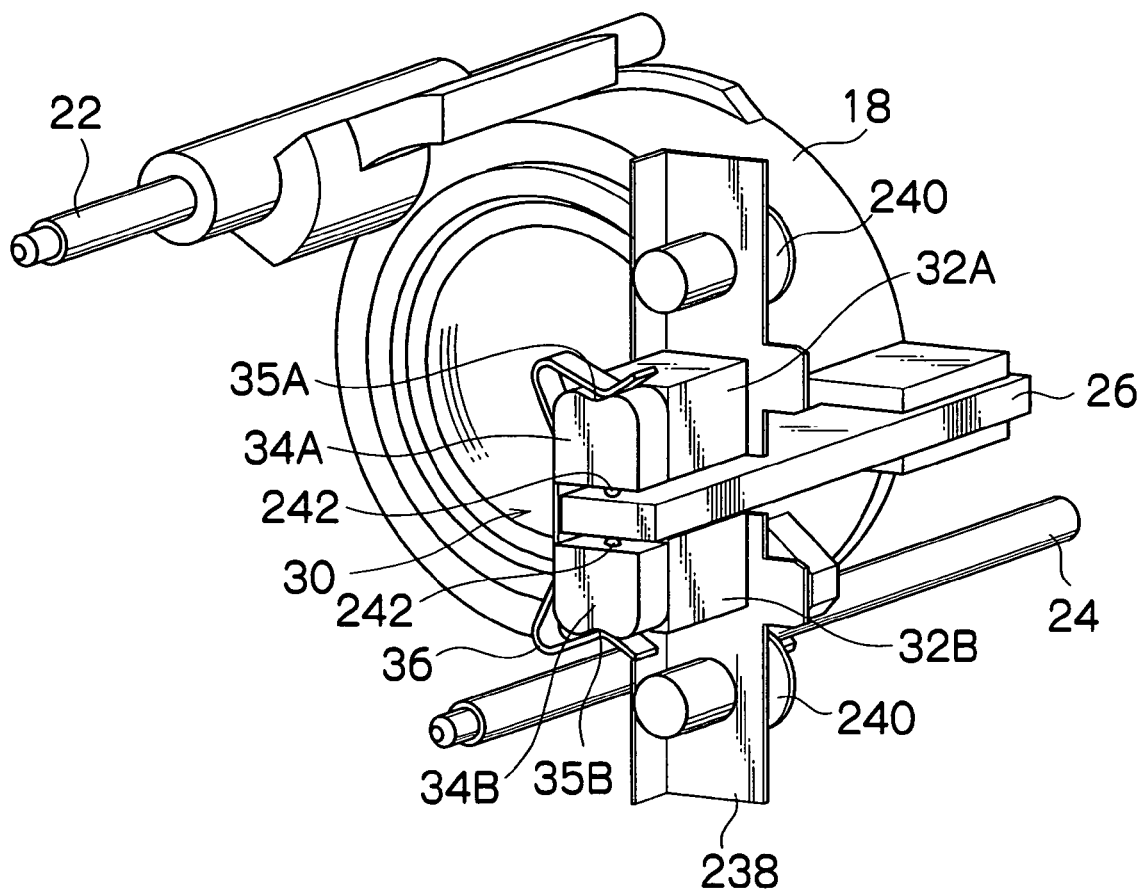
FIG. 15 is a perspective view showing a construction of an actuator of a fourth embodiment.

FIG. 15 is a perspective view showing a construction of the actuator 30 of the fourth embodiment, and shows the perspective view from the different direction from that of FIG. 1. Hereinafter, the explanation will be made with the example of the actuator 30 which drives the lens frame 18, but the actuator 30 which drives the lens frame 20 is constructed in the same manner.

As shown in FIG. 15, the actuator 30 is mainly constructed by the piezoelectric elements 32A and 32B, the driving members 34A and 34B and the pressing spring 36. The piezoelectric elements 32A and 32B are placed at both sides with the driven plate 26 therebetween, and are placed so that their displacement directions are in the longitudinal direction of the driven plate 26 (namely, the driving direction). The driving members 34A and 34B are integrally mounted to one end surfaces in the displacement direction of the piezoelectric elements 32A and 32B, and a fixing member 238 is provided at the other end surfaces. The fixing member 238 is fixed to the case body 12 with screws 240 and 240.

The driving members 34A and 34B are each formed into a substantially rectangular block shape, and are constructed by a light material with high rigidity, for example, ceramics as the aforementioned driven plate 26. The dents 35A and 35B are formed on the side surface at the opposite side from the side which is opposed to the driven plate 26 in the driving members 34A and 34B.

The pressing spring 36 is the plate spring which pinches the two driving members 34A and 34B, and is engaged in the dents 35A and 35B of the respective driving members 34A and 34B, and urges the respective driving members 34A and 34B to the driven plate 26. Thereby, the driving members 34A and 34B are frictionally engaged with the driven plate 26.

A substantially semispherical projection part 242 is formed to project on the frictional engaging surface of each of the respective driving members 34A and 34B (namely, the surface at the side of the driven plate 26). Each of the respective driving members 34A and 34B abuts on the driven plate 26 via this projection part 242, and the driving members 34A and 34B are frictionally engaged with the driven plate 26 in the state of point contact.

In FIG. 15, the example using the pressing spring 36 as the urging device which urges the driving members 34A and 34B to the driven plate 26 is shown, but the driving members 34A and 34B may be individually urged by the other urging device, for example, an elastic body such as a compression spring and rubber.

The voltage of the driving pulses shown in FIG. 3, for example, is applied to the aforementioned piezoelectric elements 32A and 32B.

An operation of the actuator 30 constructed as described above will be explained next.

The actuator 30 can move the driven plate 26 (namely, the lens frame 18 or the lens frame 20) by applying the voltage of the aforementioned driving pulses to the piezoelectric elements 32A and 32B. On this occasion, the driven plate 26 and the driving members 34A and 34B are kept in a point contact state via the semispherical projection parts 242. Accordingly, the frictional force of the driven plate 26 and the driving members 34A and 34B is always kept substantially constant irrespective of the position of the driven plate 26. Further, the frictional force is not significantly influenced by the machining accuracy of the driven plate 26 and the driving members 34A and 34B.

As described above, in this embodiment, the driven plate 26 and the driving members 34A and 34B are brought into point contact, and therefore, the frictional force of the driven plate 26 and the driving members 34A and 34B is always kept substantially constant. Accordingly, by applying constant voltage to the piezoelectric elements 32A and 32B, the driven plate 26 can be always moved at a constant speed, and the moving amount of the driven plate 26 can be controlled with high precision.

In this embodiment, the driving members 34A and 34B are urged with the common pressing spring 36, and therefore, the frictional force of each of the driving members 34A and 34B and the driven plate 26 becomes substantially uniform. Accordingly, the moving amount of the driven plate 26 caused by each of the piezoelectric elements 32A and 32B becomes equal, and the moving amount of the driven plate 26 can be controlled with higher precision.

Further, this embodiment has the structure in which the driven plate 26 is provided to extend in the driving direction, and the frictional engaging surfaces of the driven plate 26 and the driving members 34A and 34B are always kept in constant positional relation with respect to the piezoelectric elements 32A and 32B, and therefore, the aforesaid frictional engaging surfaces can be kept in the vicinity of the piezoelectric elements 32A and 32B. Accordingly, the vibrations of the piezoelectric elements are transmitted to the driven plate 26 without being attenuated, and therefore, the driven plate 26 can be reliably moved when the driving pulses at a high frequency are applied to the piezoelectric elements 32A and 32B. Thereby, the driven member can be moved at a high speed even at a low voltage.

In the aforementioned fourth embodiment, the shape of the projection part 242 is formed to be semi-spherical, but the shape of the projection part 242 is not limited to this, and it may be any shape as long as it brings the driving members 34A and 34B and the driven plate 26 into point contact. Accordingly, for example, the projection part 242 may be formed into a conical shape.

In the aforementioned fourth embodiment, only one projection part 242 is formed on the frictional engaging surface of each of the driving members 34A and 34B, but two or three projection parts may be formed. When three projection parts 242 are formed, it is suitable that the three projection parts 242 are not in a straight line. In these cases, the frictional forces of the driving members 34A and 34B and the driven plate 26 become substantially constant, and therefore, movement of the driven plate 26 can be accurately performed.

Figure 16:
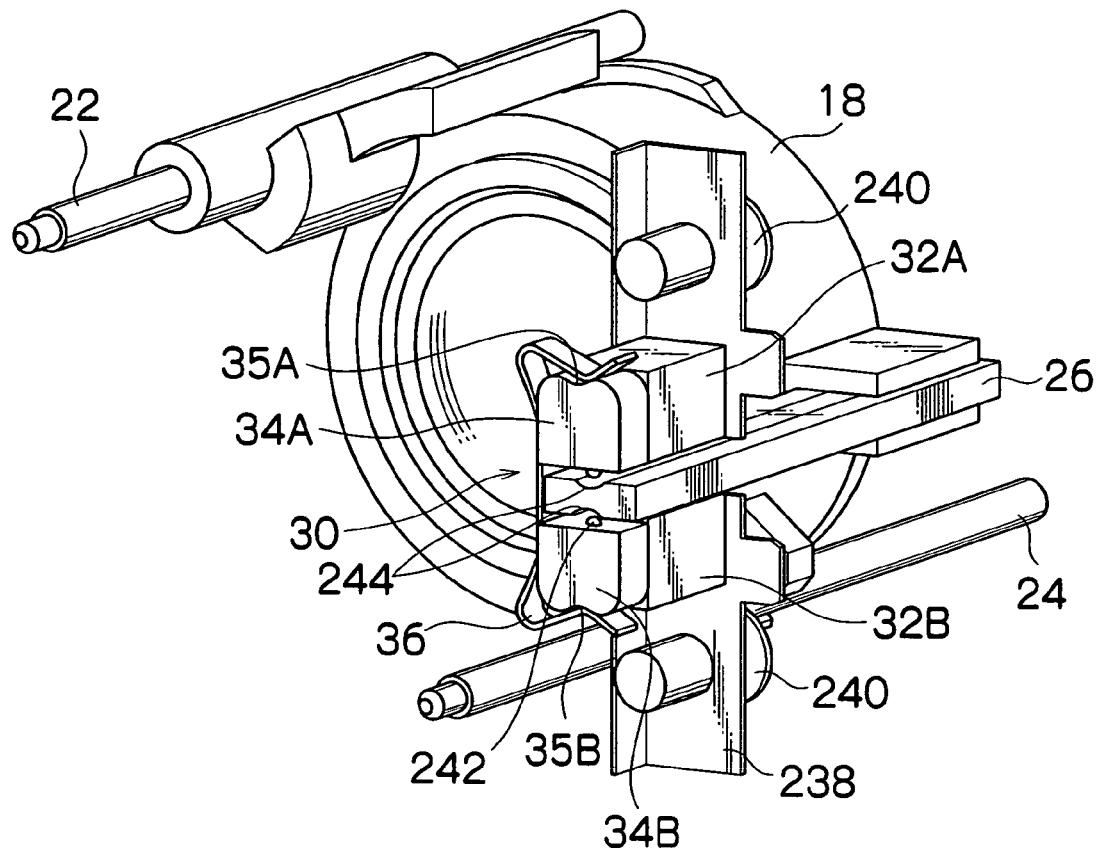
FIG. 16 is a perspective view showing an actuator with a different construction from that of FIG. 15.

In the aforementioned fourth embodiment, the frictional engaging surface of the driven plate 26 is formed into a plane shape, but the frictional engaging surface is not limited to this. For example, a groove 244 is formed in the longitudinal direction of the driven plate 26 (namely, the driving direction) on the frictional engaging surface of the driven plate 26 shown in FIG. 16. In the groove 244, the sectional shape which is orthogonal to the driving direction is formed into an arc shape with a smaller curvature than a curvature of the projection part 242, so that the projection part 242 abuts on the inside of this groove 244. Accordingly, the semi-spherical projection part 242 abuts on the groove 244 in the arc shape with a small curvature, and therefore, the driving members 34A and 34B are brought into point contact with the driven plate 26. Rattle of the driving members 34A and 34B and the driven plate 26 can be prevented by the projection parts 242 abutting on the insides of the grooves 244.

Figure 17:
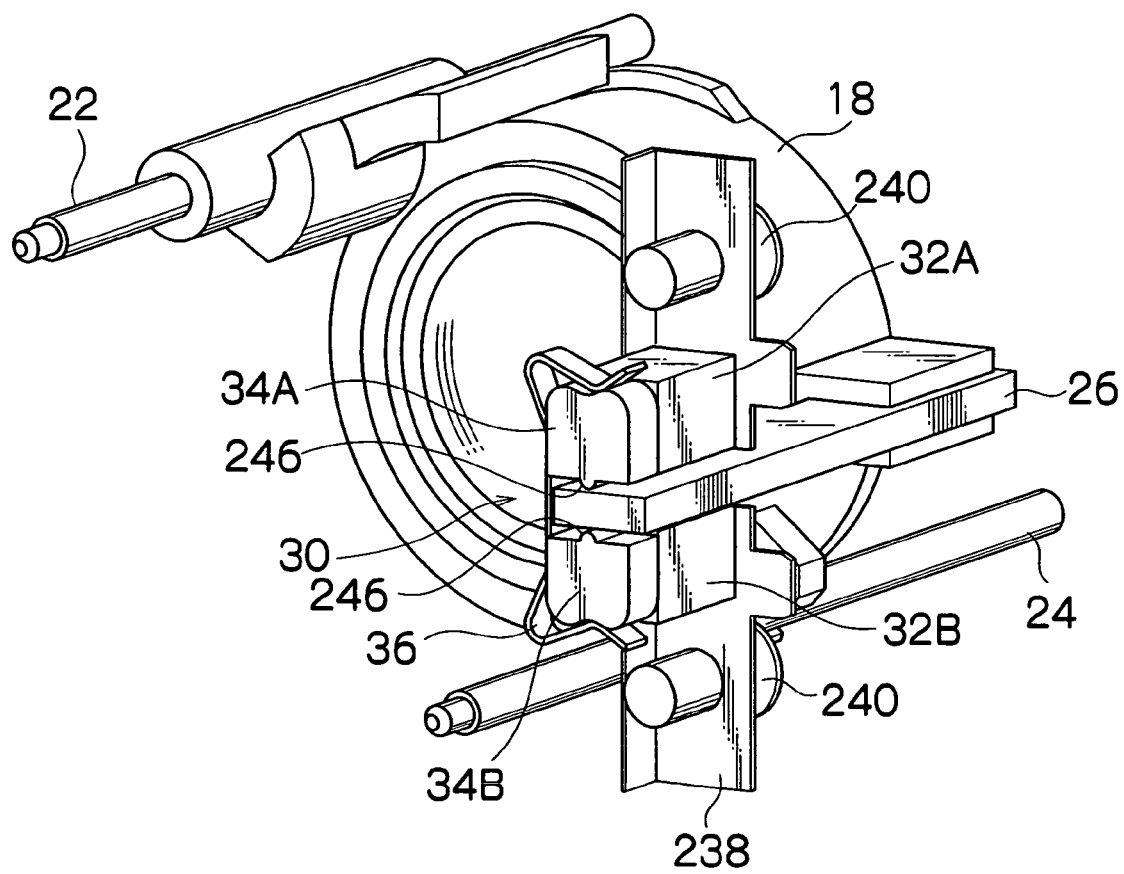
FIG. 17 is a perspective view showing a construction of an actuator of a fifth embodiment.

FIG. 17 is a perspective view showing a construction of an actuator of a fifth embodiment.

As shown in the drawing, in the fifth embodiment, a protruding ridge part 246 is formed on the frictional engaging surface of each of the driving members 34A and 34B. The protruding ridge portion 246 is formed in the longitudinal direction (namely, the driving direction) of the driven plate 26, and the sectional shape orthogonal to the driving direction is formed into a semispherical shape. Accordingly, the driven plate 26, and the driving members 34A and 34B are in the state in which they are in line contact in the driving direction. Therefore, even if the driven plate 26 is moved in the driving direction, the frictional forces of the driven plate 26 and the driving members 34A and 34B are always kept substantially constant. The frictional force of the driving member 34A and the driven plate 26 and the frictional force of the driving member 34B and the driven plate 26 become substantially uniform. Therefore, according to the fifth embodiment, moving of the driven plate 26 can be accurately performed.

In the fifth embodiment, the arc-shaped groove 244 (see FIG. 16) may be formed in the driving direction on the frictional engaging surface of the driven plate 26, and the protruding ridge part 246 may be frictionally engaged in this groove 244. In this case, it is preferable to make the curvature of the sectional shape of the groove 244 smaller than the curvature of the sectional shape of the protruding ridge part 246, whereby the driven plate 26 and the driving members 34A and 34B are in line contact, and the frictional force is kept substantially constant. The protruding ridge part 246 abuts on the groove 244 with the arc-shaped section, and therefore, rattle of the driven plate 26 and the driving members 34A and 34B can be prevented.

Figure 18:
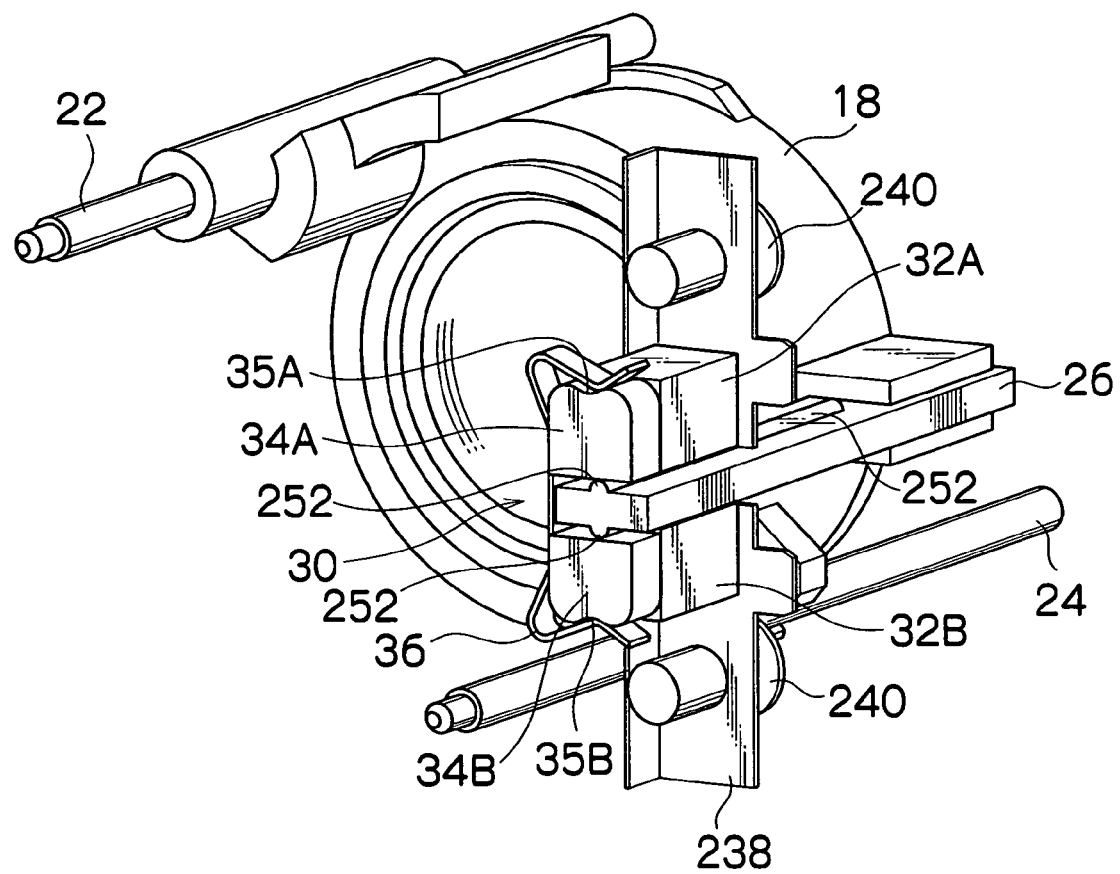
FIG. 18 is a perspective view showing a construction of an actuator of a sixth embodiment.

FIG. 18 is a perspective view showing a construction of an actuator of a sixth embodiment.

As shown in the drawing, in the sixth embodiment, a protruding ridge part 252 is formed on the frictional engaging surface of the driven plate 26. The protruding ridge part 252 is formed in the longitudinal direction (namely, the driving direction) of the driven plate 26, and its sectional shape orthogonal to the driving direction is formed to be semicircular. The driven plate 26, and the driving members 34A and 34B abut on each other via the protruding ridge parts 252. Therefore, the driven plate 26 and the driving members 34A and 34B are in the state in which they are in line contact in the driving direction. Therefore, even if the driven plate 26 is moved in the driving direction, the frictional forces of the driven plate 26 and the driving members 34A and 34B are always kept substantially constant. The frictional force of the driving member 34A and the driven plate 26 and the frictional force of the driving member 34B and the driven plate 26 are substantially uniform. Accordingly, according to the sixth embodiment, movement of the driven plate 26 can be accurately performed.

In the aforementioned sixth embodiment, arc-shaped grooves are formed on the frictional engaging surfaces of the driving members 34A and 34B, and the driven plate 26 may be made to abut on the grooves. In this case, it is suitable that the groove is formed along the driving direction, and its sectional shape is formed into an arc shape with a smaller curvature than the curvature of the sectional shape of the protruding ridge part 252. Thereby, the driven plate 26 and the driving members 34A and 34B are in line contact to be able to keep the frictional forces substantially constant, and rattle of the driven plate 26, and the driving members 34A and 34B can be prevented.

In the aforementioned fourth to sixth embodiment, the examples in which the driven members (driven plates 26) are driven parallel with the optical axes are shown, but the driving direction of the driven member is not limited to this, and the driven member may be driven in the orthogonal direction to the optical axis, for example. Alternatively, the driven member may be driven to rotate. It is suitable if only the aforementioned groove 244, and the protruding ridge parts 246 and 252 are formed along the driving direction.

Figure 19:
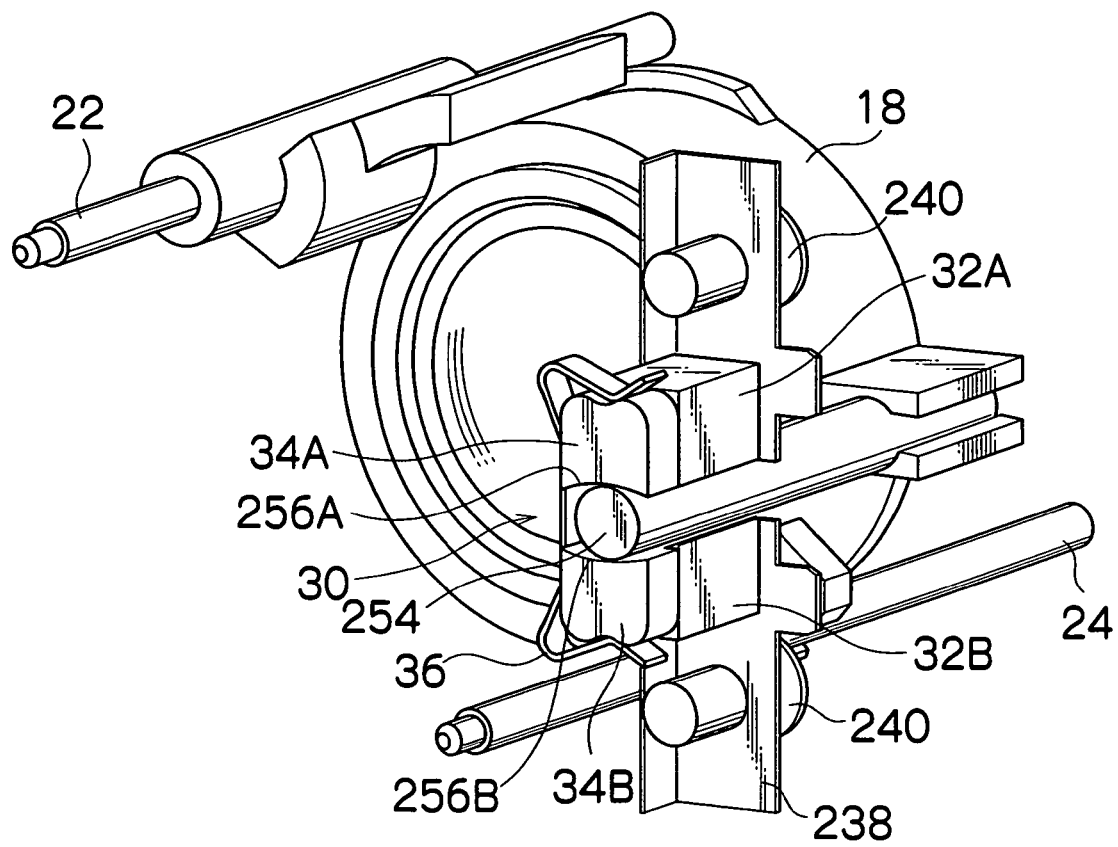
FIG. 19 is a perspective view showing a construction of an actuator of a seventh embodiment.

FIG. 19 is a perspective view showing a construction of an actuator of the seventh embodiment.

As shown in the drawing, in the seventh embodiment, the driven member 254 is formed into a columnar shape. The driven member 254 is placed so that its axial direction is parallel with the optical axis, and is fixed to the lens frame 18. Meanwhile, the driving members 34A and 34B has frictional engaging surfaces 256A and 256B with the driven member 254 formed into arc-shaped curved surfaces, and their curvatures become smaller than the curvature of the sectional shape of the driven member 254. Accordingly, the driven member 254 and the driving members 34A and 34B are frictionally engaged in a line contact state.

According to the seventh embodiment constructed as described above, the driven member 254 and the driving members 34A and 34B are in line contact, and therefore, the frictional forces are kept substantially constant, and movement of the driven member 254 can be accurately performed. The columnar driven member 254 and the arc-shaped curved surfaces 256A and 256B of the driving members 34A and 34B abut on each other, and therefore, rattle of the driven member 254 and the driving members 34A and 34B can be prevented.

In the aforementioned fourth to seventh embodiments, the shapes of the waveforms of the driving pulses which are applied to the piezoelectric elements 32A and 32B are not limited to the aforementioned rectangular shapes. For example, the driving pulses in the shapes as shown in FIGS. 4A and 4B, for example, may be applied.

Next, an eighth embodiment of the actuator according to the present invention will be explained. In the eighth embodiment, the lens device is constructed as shown in FIG. 1 as in the first embodiment, and the basic structure is formed as shown in FIG. 2. The voltage of the driving pulses in the shapes as shown in FIGS. 4A and 4B are applied to the piezoelectric elements 32A and 32B.

Figure 20:
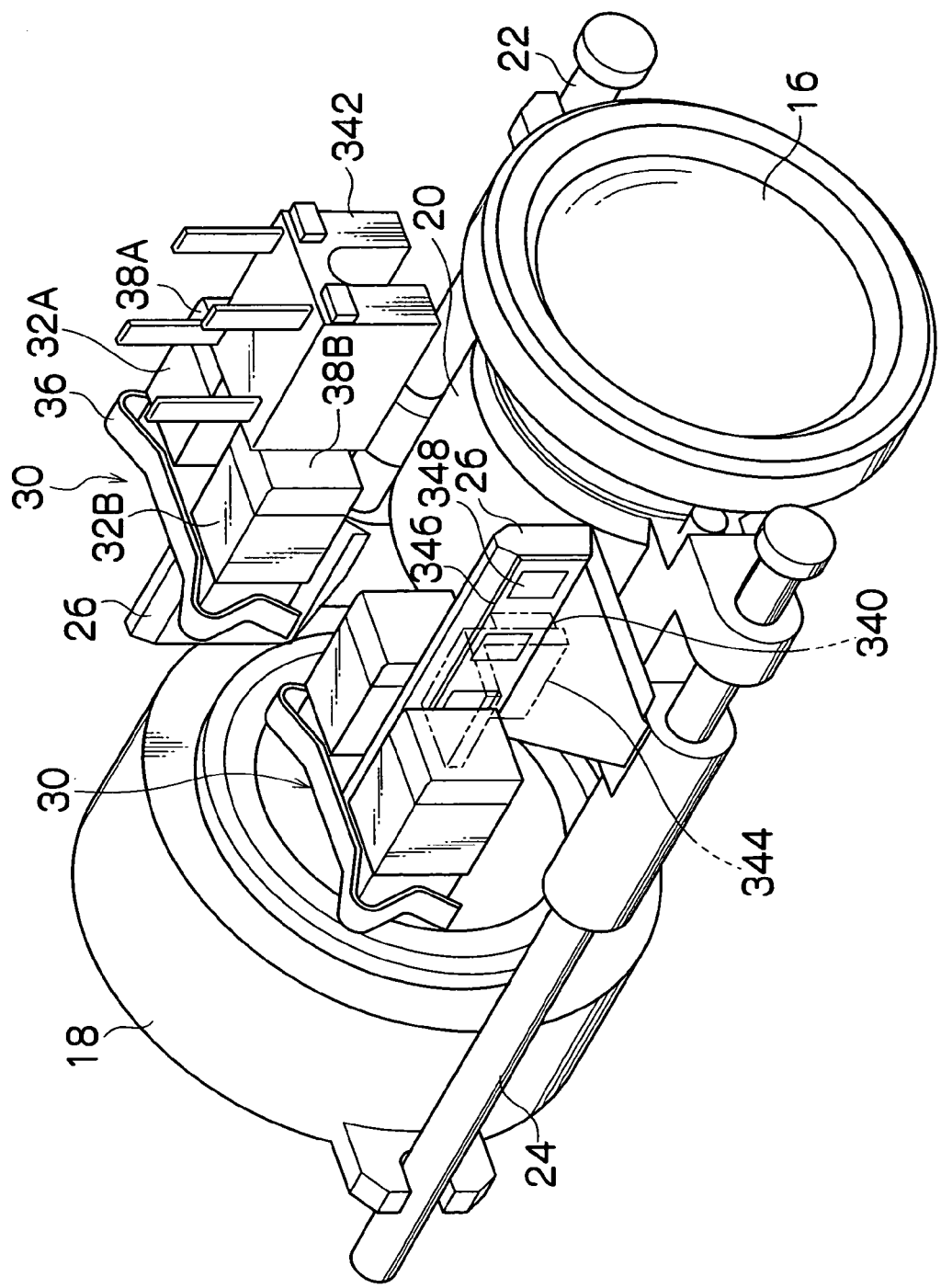
FIG. 20 is a perspective view showing a construction of a lens device to which an actuator of an eighth embodiment is applied.
Figure 21:
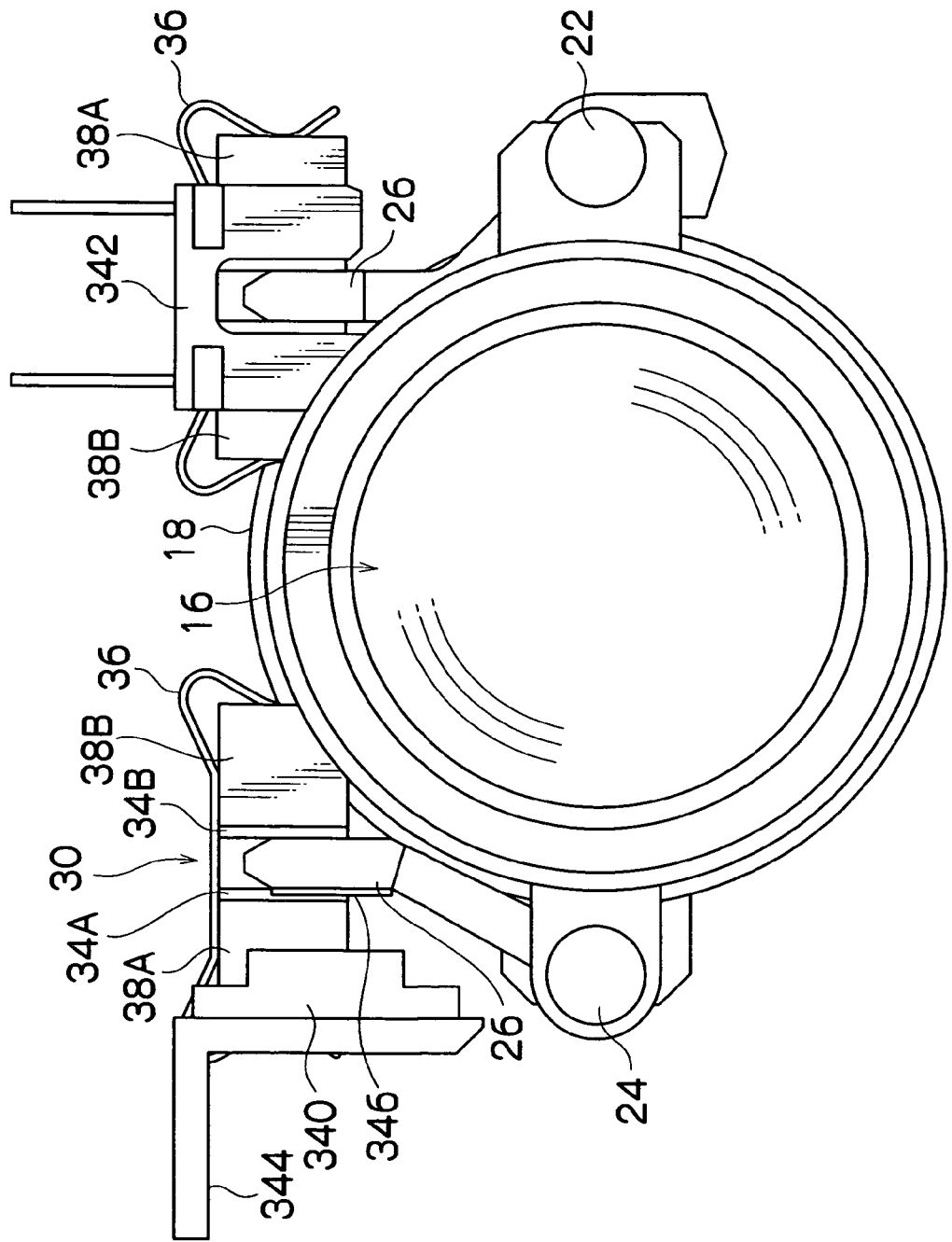
FIG. 21 is a front view of the lens device in FIG. 20.

In the lens device of the eighth embodiment, a position detector which detects the positions of the lens frames 18 and 20 are provided as shown in FIG. 20. As the position detector which detects the position of the lens frame 18, a reflection type photo-reflector 340 is used, and as a position detector which detects the position of the lens frame 20, a transmission type photo-interrupter 342 is used. In FIG. 21, a front view of the lens device in FIG. 20 is shown.

The photo-interrupter 342 is placed beside the actuator 30 and along the driven plate 26 integrated with the lens frame 18. The photo-interrupter 342 is formed into a portal shape, and its lower part is divided into two with a light emitting part provided at one portion and a light receiving part provided at the other portion. The driven plate 26 is inserted in and removed from between this light emitting part and the light receiving part. Namely, when the actuator 30 is driven, the driven plate 26 is driven in the optical axis direction and its tip end is inserted in and removed from between the light emitting part and the light receiving part. Accordingly, light is projected to the light receiving part from the light emitting part of the photo-interrupter 342, and the light is received at the light receiving part to detect the light amount, whereby the position of the driven plate 26 can be detected.

The position detector constructed as described above also serves as a light shielding body for the photo-interrupter 342, and therefore, it is not necessary to provide a new light shielding body. The position of the driven plate 26 which is driven by the actuator 30 is directly detected in the photo-interrupter 342, and therefore, the position detection can be accurately performed.

Meanwhile, the photo-reflector 340 is placed beside the actuator 30 along the driven plate 26 integrated with the lens frame 20. The photo-reflector 340 has a light projecting part and a light receiving part, and the reflection light emitted from the light projecting part is received at the light receiving part to detect the light amount. The photo-reflector 340 is supported by a support member 344 mounted to the lid 14 of the case (see FIG. 1) and is placed to be opposed to the driven plate 26.

A reflection plate 346 is mounted to a surface of the driven plate 26 at the side of the photo-reflector 340. The reflection plate 346 is provided with a plurality of reflectors 348 at constant spaces in the longitudinal direction of the driven plate 26. Accordingly, the moving amount of the driven plate 26 can be detected by detecting the reflectors 348 of the reflection plate 346 with the photo-reflector 340.

In the position detector constructed as described above, the reflection plate 346 is provided at the driven plate 26, and therefore, it is not necessary to provide a new reflection member for the photo-reflector 340. The position of the driven plate 26 which is driven by the actuator 30 is directly detected by the photo-reflector 340, and therefore, the position detection can be performed accurately.

Next, an operation of the lens device constructed as described above will be explained.

Figure 22:
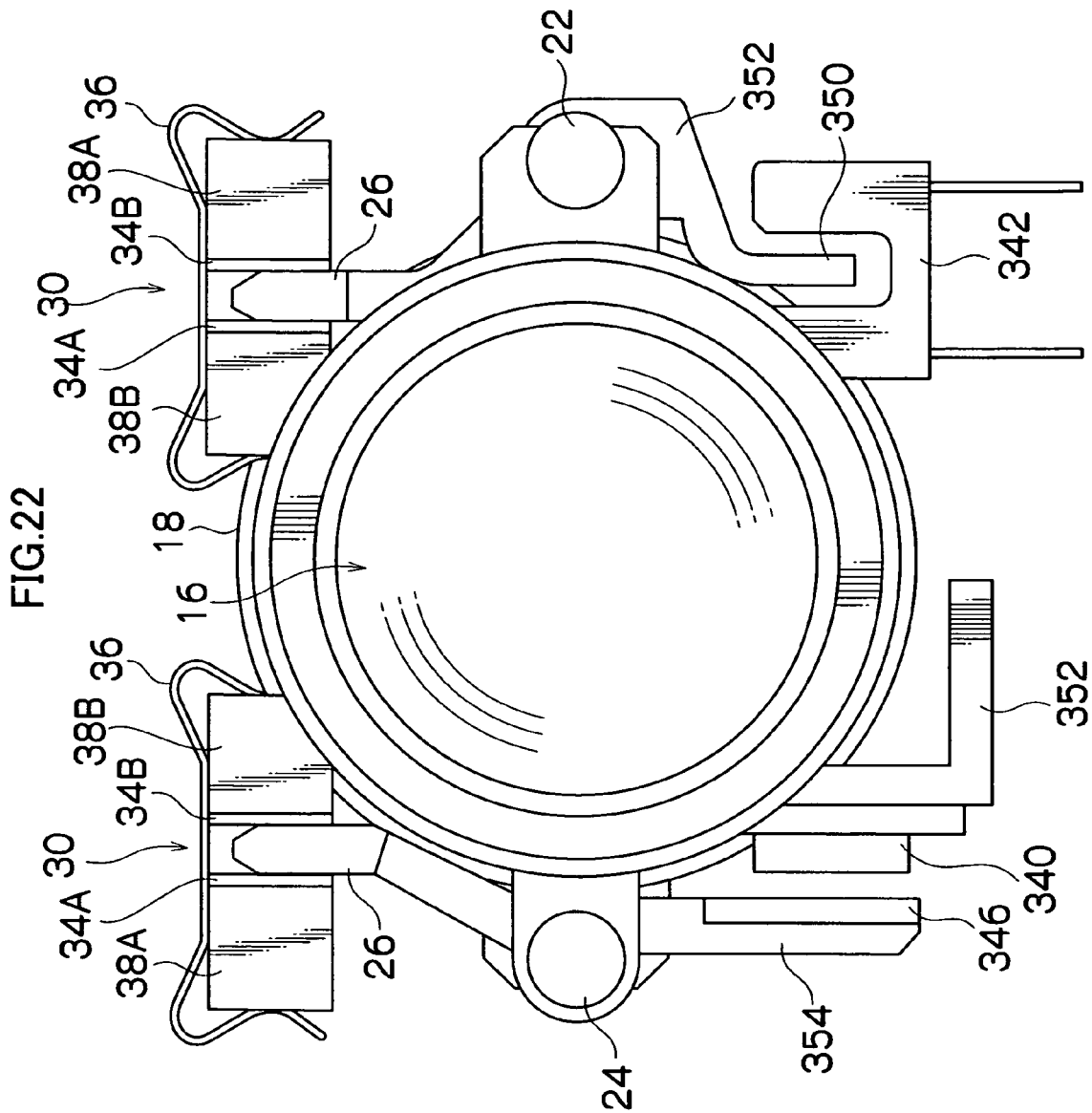
FIG. 22 is a front view showing a lens device of a comparative example.

FIG. 22 shows a front view of the lens device in which a position detector is mounted by an ordinary method, as a lens device of a comparative example. In the lens device shown in the same drawing, the photo-reflector 340 and the photo-interrupter 342, which are position detectors, are placed in a vacant space in a lower position. The photo-reflector 340 is fixed to the case body 12 (see FIG. 1) via an L-shaped support member 352, and the photo-interrupter 342 is directly fixed to the case body 12 (see FIG. 1). A light shielding body 350 which is inserted into and removed from the photo-interrupter 342 is integrally formed at the lens frame 20, and is provide to extend in the optical axis direction. Meanwhile, the reflection plate 346 for the photo-reflector 340 is supported by a support member 354 integrally formed at the lens frame 18, and this support member 354 and the reflection plate 346 are provided to extend in the optical axis direction.

Accordingly, in the lens device in FIG. 22, the light shielding body 350 and the support member 354 of the reflection plate 346 are provided to extend in the optical axis direction, and a large space is required. Further, the light shielding body 350 and the support member 354 are formed integrally with the lens frames 18 and 20, and the lens frames 18 and 20 both move in the optical axis direction. Therefore, it is necessary to secure the space for them. Accordingly, the lens device in FIG. 22 requires a large space under the lens frames 18 and 20, and hence, has the problem of the lens device increasing in size.

On the other hand, the lens device of this embodiment shown in FIGS. 20 and 21 constructs the position detector by utilizing the driven plate 26 which is provided to extend in the optical axis direction. Namely, in the position detector at the side of the lens frame 18, the driven plate 26 also serves as the light shielding body for the photo-interrupter 342, and in the position detector at the side of the lens frame 20, the reflection plate 346 for the photo-reflector 340 is provided at the driven plate 26. Accordingly, the light shielding body 350 and the support member 354 of the reflection plate 346 shown in FIG. 22 are not needed, and therefore, the lens device can be made compact.

According to the lens device of this embodiment, the position detector is constructed by utilizing the driven plate 26, and therefore, the installation space of the position detector can be made small, and the lens device can be made compact. Further, in this embodiment, the photo-interrupter 342 and the photo-reflector 340 are placed in the vacant space beside the actuator 30, and therefore, the lens device can be made compact.

In this embodiment, the position of the driven plate 26 which is moved by the actuator 30 is directly detected with the photo-interrupter 342 and the photo-reflector 340, and therefore, the moving amount of the driven plate 26 can be accurately measured. Accordingly, the actuator 30 is controlled based on the detection values of the photo-reflector 340 and the photo-interrupter 342, and thereby, the drive control of the lens frames 18 and 20 can be performed with high precision.

The aforementioned eighth embodiment uses the photo-reflector 340 as the position detector of the lens frame 18, and uses the photo-interrupter 342 as the position detector of the lens frame 20, but the position detectors are not limited to them, and the photo-reflectors 340 may be used for both of them, or the photo-interrupters 342 may be used for both of them.

In the aforementioned eighth embodiment, the substantially sawtooth-shaped driving pulses are applied to the piezoelectric elements 32A and 32B, but the shapes of the applied driving pulses are not limited to them. For example, the driving pulses shown in FIGS. 3A and 3B may be applied, for example.

What is claimed is:

1. An actuator comprising a piezoelectric element, a driving member integrally mounted to the piezoelectric element, a driven member frictionally engaged with the driving member and provided to extend in a driving direction, and an urging device which urges the driving member to the driven member, wherein a plurality of piezoelectric elements and driving members are provided and placed at both lateral sides of the driven member, and the driven member is held from said both lateral sides by the driving members to be frictionally engaged with the driving members, wherein one of said driving members is movable separately from another driving member.

2. The actuator according to claim 1, wherein the plurality of driving members are held by a common plate spring which is the urging device, and are frictionally engaged with the driven member.

3. The actuator according to claim 1, wherein the urging device has two holding parts, and is constructed to exhibit an urging force in a direction to narrow a space of the two holding parts, and the two holding parts are respectively mounted to press the different driving members and hold the driving members.

4. The actuator according to claim 1, wherein the actuator is a lens moving actuator which moves a lens frame integrally mounted to the driven member along an optical axis.

5. The actuator according to claim 1, further comprising pressing plates which are fixed to a portion of a lens device to which said actuator is applied, wherein said pressing plates are mounted to surfaces of one end of said piezoelectric elements, and said driving members are mounted to surfaces of another end of said piezoelectric elements.

6. The actuator according to claim 1, wherein vibrations of said piezoelectric elements are transmitted to said driven member reliably so that said actuator is controlled by a driving pulse at a high frequency.

7. The actuator according to claim 1, wherein said actuator is a lens moving actuator which moves a lens frame at a high speed of 2 mm/s or higher.

8. The actuator according to claim 1, wherein said actuator is driven at a high frequency of about 20 kHz.

9. The actuator according to claim 1, wherein the plurality of driving members are held by an elastic body which is the urging device, and are frictionally engaged with the driven member.

* * * * *